US009985948B2

(12) United States Patent
Kuroyanagi et al.

(10) Patent No.: US 9,985,948 B2
(45) Date of Patent: May 29, 2018

(54) IMAGE FORMING APPARATUS, INFORMATION PROCESSING SYSTEM, AND NON-TRANSITORY COMPUTER-READABLE MEDIUM

(71) Applicants: Tomohiro Kuroyanagi, Kanagawa (JP); Makoto Sasaki, Kanagawa (JP); Junki Aoki, Kanagawa (JP); Takuya Mori, Tokyo (JP); Itaru Kodaira, Kanagawa (JP); Yukinori Ishii, Kanagawa (JP); Hiroaki Ikkanzaka, Tokyo (JP); Fumiyoshi Kittaka, Kanagawa (JP); Masaki Tasaka, Kanagawa (JP); Koichiro Maemura, Kanagawa (JP); Hiroyuki Sakuyama, Tokyo (JP); Tohru Sasaki, Kanagawa (JP); Atsushi Okazato, Kanagawa (JP)

(72) Inventors: Tomohiro Kuroyanagi, Kanagawa (JP); Makoto Sasaki, Kanagawa (JP); Junki Aoki, Kanagawa (JP); Takuya Mori, Tokyo (JP); Itaru Kodaira, Kanagawa (JP); Yukinori Ishii, Kanagawa (JP); Hiroaki Ikkanzaka, Tokyo (JP); Fumiyoshi Kittaka, Kanagawa (JP); Masaki Tasaka, Kanagawa (JP); Koichiro Maemura, Kanagawa (JP); Hiroyuki Sakuyama, Tokyo (JP); Tohru Sasaki, Kanagawa (JP); Atsushi Okazato, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days. days.

(21) Appl. No.: 14/990,878

(22) Filed: Jan. 8, 2016

(65) Prior Publication Data

US 2016/0212114 A1 Jul. 21, 2016

(30) Foreign Application Priority Data

Jan. 20, 2015 (JP) ................................ 2015-008797

(51) Int. Cl.
*G06F 11/30* (2006.01)
*H04W 12/08* (2009.01)
(Continued)

(52) U.S. Cl.
CPC .............. *H04L 63/08* (2013.01); *G06F 13/00* (2013.01); *H04N 1/00108* (2013.01);
(Continued)

(58) Field of Classification Search
CPC ....... B62K 11/00; B62K 19/46; G06F 21/608; G06F 21/10; G06F 21/31; G06F 3/1206;
(Continued)

(56) References Cited

U.S. PATENT DOCUMENTS 6,583,888 B1 * 6/2003 Salgado ................. G03G 21/02 358/1.14
2003/0151766 A1 * 8/2003 Clough ................. G06F 3/1222 358/1.15

(Continued)

FOREIGN PATENT DOCUMENTS

JP 2013-190864 9/2013
JP 2013190864 A * 9/2013

*Primary Examiner* — Chad Dickerson
(74) *Attorney, Agent, or Firm* — Harness, Dickey & Pierce, P.L.C.

(57) ABSTRACT

An image forming apparatus includes: a communicating unit which communicates with a portable terminal device and an external device; a storage control unit which controls to store transfer destination information of the external device to which information from the portable terminal device is allowed to be transferred in a storage unit; a determining unit which determines whether a request from the portable terminal device is the request to the external device indi- (Continued)

cated by the transfer destination information stored in the storage unit; and a communication control unit which controls the communicating unit to transfer the request from the portable terminal device to the external device indicated by the transfer destination information when the determining unit determines that the request is the request to the external device indicated by the transfer destination information.

18 Claims, 22 Drawing Sheets

(51) Int. Cl.
*G06F 17/30* (2006.01)
*H04L 29/06* (2006.01)
*H04N 1/00* (2006.01)
*G06F 13/00* (2006.01)
*G06F 3/12* (2006.01)
*H04W 76/02* (2009.01)

(52) U.S. Cl.
CPC ........ *H04N 1/00838* (2013.01); *H04W 12/08* (2013.01); *H04W 76/023* (2013.01)

(58) Field of Classification Search
CPC .... G06F 3/1209; G06F 3/1222; G06F 3/1236; G06F 3/1238; G06F 3/1246; G06F 3/1247; G06F 3/1285; G06F 3/1288; G06F 3/1292; G06F 3/1293; H04N 1/00204; H04N 1/00244; H04N 1/00843; H04N 1/00864; H04N 1/00875; H04N 1/4406; H04N 1/444; H04N 2201/0039; H04N 2201/0094
USPC ....................... 358/1.11–1.18, 1.9, 2.1, 3.23; 709/201–216, 223–226; 726/1–6, 26–33; 713/182
See application file for complete search history.

(56) References Cited

U.S. PATENT DOCUMENTS

2004/0179220 A1* 9/2004 Van Oosterhout .... G06F 21/608 358/1.13
2007/0180236 A1 8/2007 Kuroyanagi et al.
2008/0021933 A1* 1/2008 Ono ....................... G06Q 10/06
2008/0259388 A1* 10/2008 Sawaguchi .......... G03G 21/046 358/1.15
2009/0225354 A1* 9/2009 Yonezawa .......... H04N 1/00233 358/1.15
2010/0110465 A1* 5/2010 Ferlitsch ............... G06F 3/1206 358/1.13
2010/0231944 A1* 9/2010 Takahashi ........... G06F 11/0733 358/1.13
2010/0309504 A1* 12/2010 Partridge .............. G06F 3/1293 358/1.15
2011/0002003 A1* 1/2011 Suwabe ................ G06F 21/629 358/1.14
2011/0043852 A1* 2/2011 Uejo ..................... G06F 3/1222 358/1.15
2011/0081949 A1* 4/2011 Natarajan ............. H04W 4/001 455/557
2011/0202915 A1 8/2011 Kuroyanagi
2012/0023451 A1 1/2012 Kuroyanagi
2012/0212761 A1 8/2012 Kuroyanagi
2013/0057882 A1* 3/2013 Ohta ..................... G06F 9/5011 358/1.9
2013/0100475 A1 4/2013 Kuroyanagi
2014/0078530 A1* 3/2014 Lee ....................... G06F 21/608 358/1.13
2014/0204416 A1 7/2014 Kuroyanagi
2014/0376054 A1 12/2014 Kuroyanagi
2015/0271353 A1 9/2015 Nishimura et al.
2015/0293728 A1 10/2015 Nishimura et al.
2015/0341441 A1 11/2015 Saitoh et al.

* cited by examiner

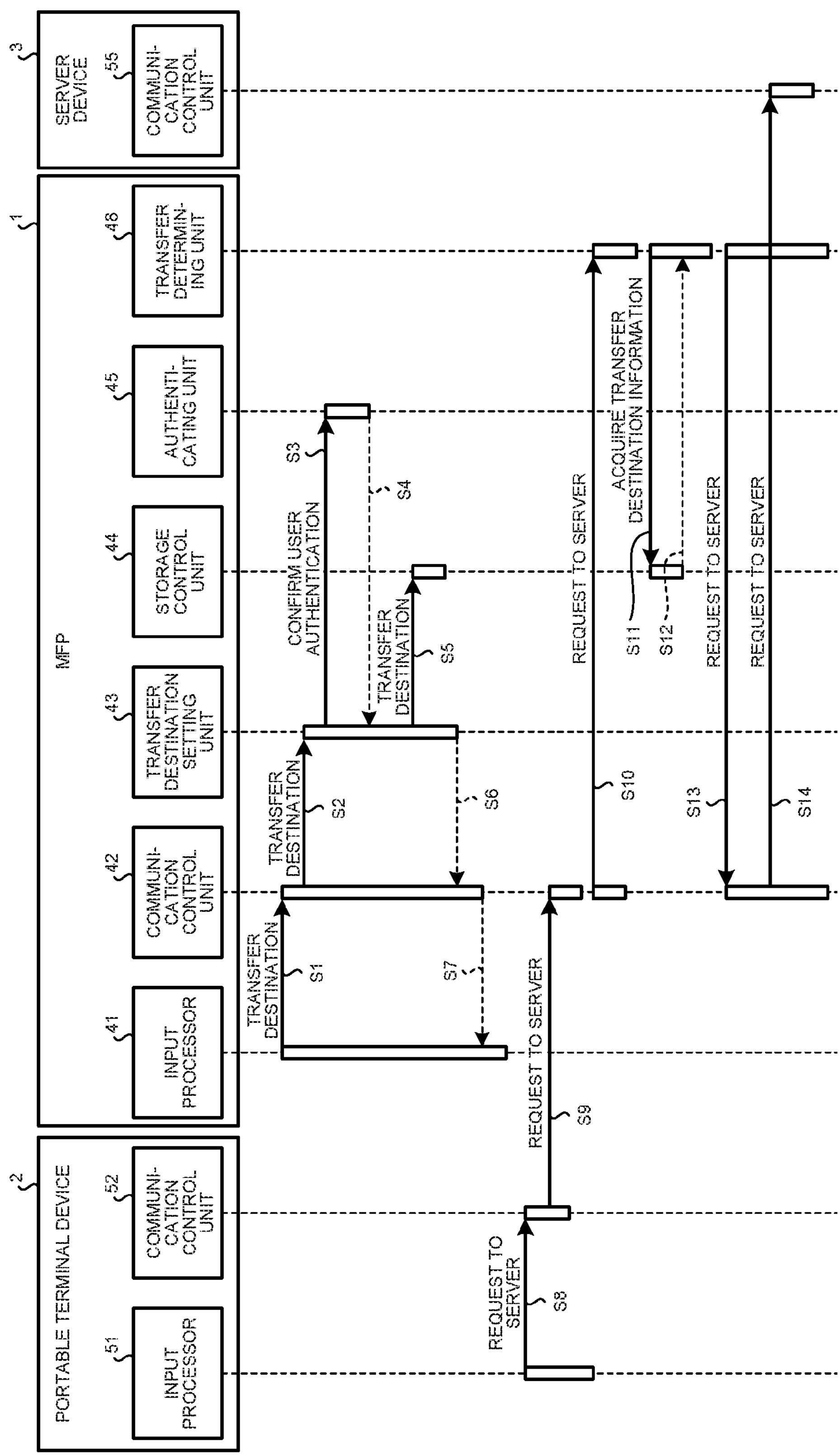
FIG.8
3
SERVER DEVICE
55
COMMUNI-CATION CONTROL UNIT
1
MFP
48
TRANSFER DETERMIN-ING UNIT
45
AUTHENTI-CATING UNIT
44
STORAGE CONTROL UNIT
43
TRANSFER DESTINATION SETTING UNIT
42
COMMUNI-CATION CONTROL UNIT
41
INPUT PROCESSOR
2
PORTABLE TERMINAL DEVICE
52
COMMUNI-CATION CONTROL UNIT
51
INPUT PROCESSOR
S1
TRANSFER DESTINATION
S2
TRANSFER DESTINATION
S3
CONFIRM USER AUTHENTICATION
S4
S5
TRANSFER DESTINATION
S6
S7
S8
REQUEST TO SERVER
S9
REQUEST TO SERVER
S10
REQUEST TO SERVER
S11
ACQUIRE TRANSFER DESTINATION INFORMATION
S12
S13
REQUEST TO SERVER
S14
REQUEST TO SERVER

FIG.11

| REQUEST DESTINATION | API |
|---|---|
| MFP | GET/mfp/scan/job_state |
| | PUT/mfp/scan/job |
| | GET/mfp/scan/setting |
| | GET/mfp/scan/sender |
| | ... |
| SERVER | GET/server/address |
| | GET/server/state |
| | PUT/server/job_log |
| | ... |

FIG. 12

| API | DESCRIPTION OF API | SECURITY LEVEL |
|---|---|---|
| GET/server/address | ACQUIRE ADDRESS BOOK | 1 |
| GET/server/state | ACQUIRE STATE | 1 |
| PUT/server/user_setting/quick_mode | SET HIGH-SPEED MODE (VALID/INVALID) | 2 |
| PUT/server/user_setting/url_mode | SET URL TRANSMISSION (VALID/INVALID) | 2 |
| PUT/server/job_log | WRITE JOB LOG | 2 |
| PUT/server/address/sender | WRITE ADDRESS SENDER | 2 |
| PUT/server/address/name | WRITE ADDRESS USER NAME | 2 |
| PUT/server/file/rename | CHANGE FILE NAME | 2 |
| POST/server/file_upload | FILE UPLOAD | 3 |
| ... | ... | ... |

FIG.13

| API | DESCRIPTION OF API | GENERAL USER ALLOWED | USER ADMINISTRATOR | DEVICE ADMINISTRATOR ALLOWED |
|---|---|---|---|---|
| GET/server/address | ACQUIRE ADDRESS BOOK | ○ | ○ | ○ |
| GET/server/state | ACQUIRE STATE | ○ | ○ | ○ |
| PUT/server/user_setting/quick_mode | SET HIGH-SPEED MODE (VALID/INVALID) | × | × | ○ |
| PUT/server/user_setting/url_mode | SET URL TRANSMISSION (VALID/INVALID) | × | × | ○ |
| PUT/server/job_log | WRITE JOB LOG | × | × | ○ |
| PUT/server/address/sender | WRITE ADDRESS SENDER | × | ○ | ○ |
| PUT/server/address/name | WRITE ADDRESS USER NAME | × | ○ | ○ |
| PUT/server/file/rename | CHANGE FILE NAME | × | × | ○ |
| POST/server/file_upload | FILE UPLOAD | × | × | ○ |
| ... | ... | ... | ... | ... |

FIG.14

| USER ID | SECURITY LEVEL |
|---|---|
| suzuki | 1 |
| satoh | 1 |
| tanaka | 3 |
| katayama | 2 |
| shin | 2 |
| sasaki | 3 |
| tasaka | 1 |

FIG.15

| API | DESCRIPTION OF API | GENERAL USER ALLOWED | USER ADMINISTRATOR | DEVICE ADMINISTRATOR ALLOWED |
|---|---|---|---|---|
| GET/server/address | ACQUIRE ADDRESS BOOK | 1 | 1 | 1 |
| GET/server/state | ACQUIRE STATE | 1 | 1 | 1 |
| PUT/server/user_setting/quick_mode | SET HIGH-SPEED MODE (VALID/INVALID) | 2 | 2 | 1 |
| PUT/server/user_setting/url_mode | SET URL TRANSMISSION (VALID/INVALID) | 2 | 2 | 1 |
| PUT/server/job_log | WRITE JOB LOG | 3 | 3 | 1 |
| PUT/server/address/sender | WRITE ADDRESS SENDER | 3 | 1 | 1 |
| PUT/server/address/name | WRITE ADDRESS USER NAME | 3 | 1 | 1 |
| PUT/server/file/rename | CHANGE FILE NAME | 3 | 3 | 1 |
| POST/server/file_upload | FILE UPLOAD | 3 | 3 | 1 |
| ... | ... | ... | ... | ... |

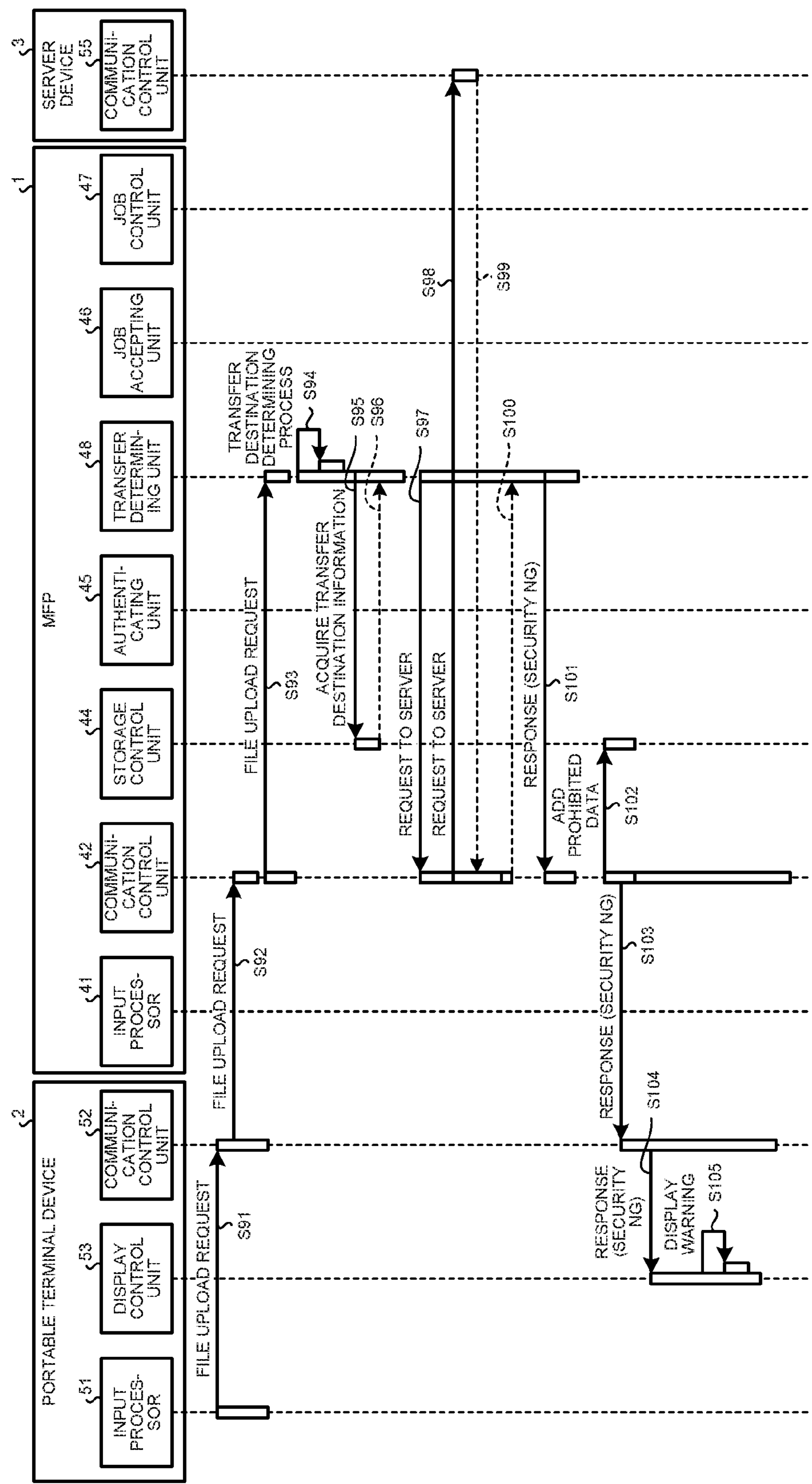
FIG.19
SERVER DEVICE
3
55
COMMUNI-CATION CONTROL UNIT
MFP
1
47
JOB CONTROL UNIT
46
JOB ACCEPTING UNIT
48
TRANSFER DETERMIN-ING UNIT
45
AUTHENTI-CATING UNIT
44
STORAGE CONTROL UNIT
42
COMMUNI-CATION CONTROL UNIT
41
INPUT PROCES-SOR
PORTABLE TERMINAL DEVICE
2
52
COMMUNI-CATION CONTROL UNIT
53
DISPLAY CONTROL UNIT
51
INPUT PROCES-SOR
FILE UPLOAD REQUEST
S91
FILE UPLOAD REQUEST
S92
FILE UPLOAD REQUEST
S93
TRANSFER DESTINATION DETERMINING PROCESS
S94
S95
S96
ACQUIRE TRANSFER DESTINATION INFORMATION
S97
REQUEST TO SERVER
REQUEST TO SERVER
S98
S99
S100
RESPONSE (SECURITY NG)
S101
ADD PROHIBITED DATA
S102
RESPONSE (SECURITY NG)
S103
S104
RESPONSE (SECURITY NG)
DISPLAY WARNING
S105

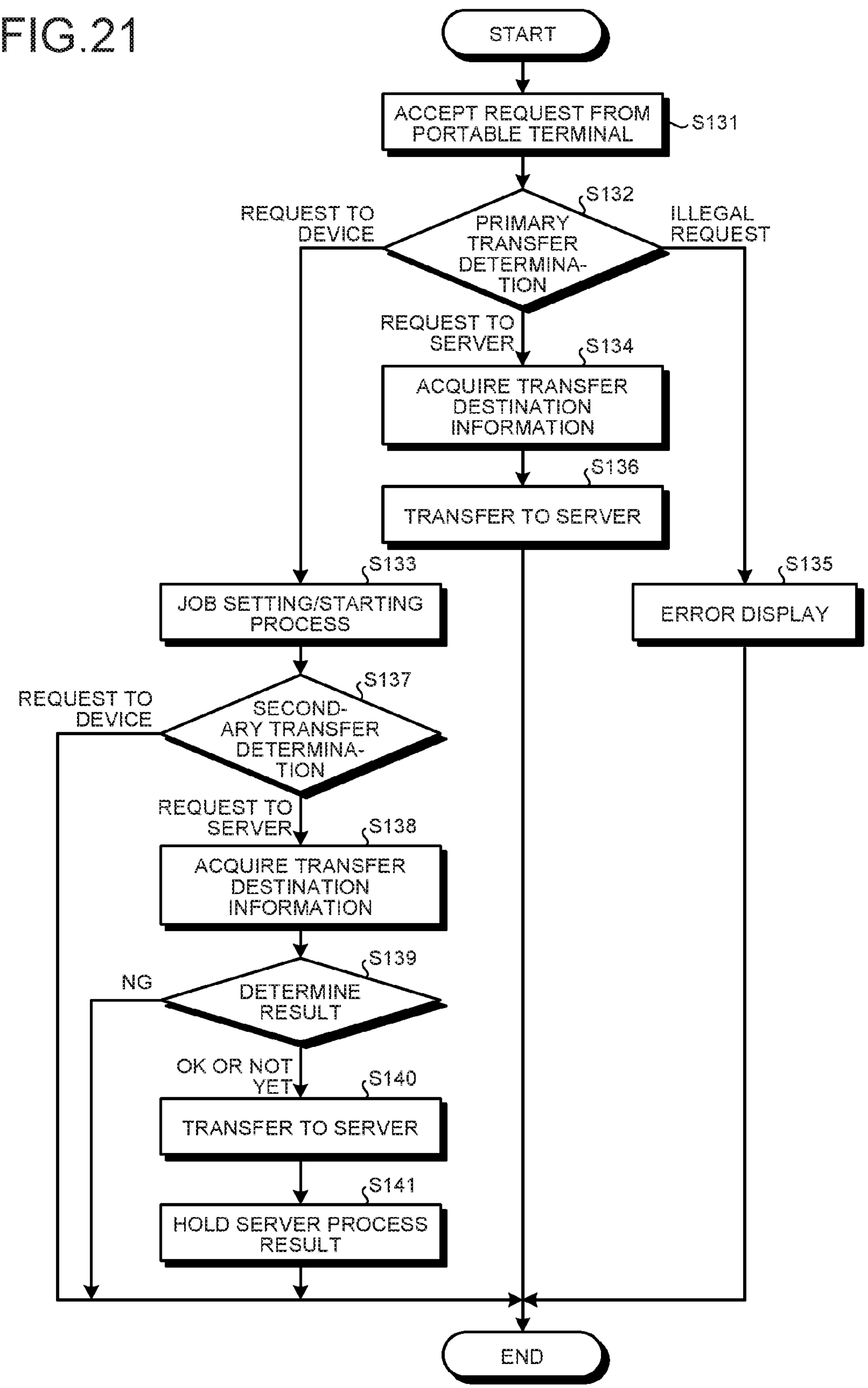
FIG.21
START
ACCEPT REQUEST FROM PORTABLE TERMINAL
S131
PRIMARY TRANSFER DETERMINATION
S132
REQUEST TO DEVICE
ILLEGAL REQUEST
REQUEST TO SERVER
ACQUIRE TRANSFER DESTINATION INFORMATION
S134
TRANSFER TO SERVER
S136
JOB SETTING/STARTING PROCESS
S133
ERROR DISPLAY
S135
SECONDARY TRANSFER DETERMINATION
S137
REQUEST TO DEVICE
REQUEST TO SERVER
ACQUIRE TRANSFER DESTINATION INFORMATION
S138
DETERMINE RESULT
S139
NG
OK OR NOT YET
TRANSFER TO SERVER
S140
HOLD SERVER PROCESS RESULT
S141
END

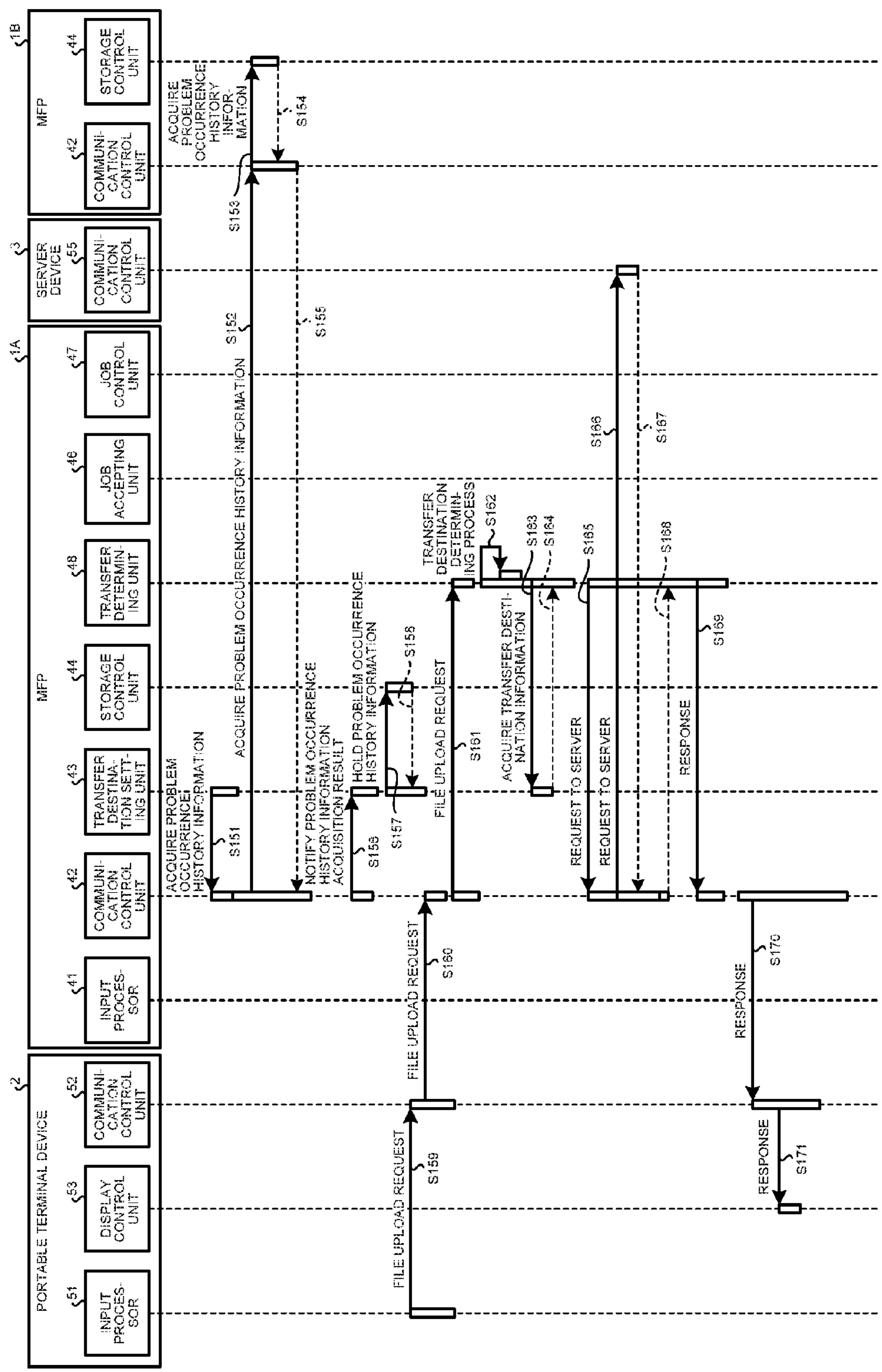
FIG.24
PORTABLE TERMINAL DEVICE
2
INPUT PROCES-SOR
51
DISPLAY CONTROL UNIT
53
COMMUNI-CATION CONTROL UNIT
52
MFP
1A
INPUT PROCES-SOR
41
COMMUNI-CATION CONTROL UNIT
42
TRANSFER DESTINA-TION SETT-ING UNIT
43
STORAGE CONTROL UNIT
44
TRANSFER DETERMIN-ING UNIT
48
JOB ACCEPTING UNIT
46
JOB CONTROL UNIT
47
SERVER DEVICE
3
COMMUNI-CATION CONTROL UNIT
55
MFP
1B
COMMUNI-CATION CONTROL UNIT
42
STORAGE CONTROL UNIT
44
ACQUIRE PROBLEM OCCURRENCE HISTORY INFORMATION
S151
ACQUIRE PROBLEM OCCURRENCE HISTORY INFORMATION
S152
S153
ACQUIRE PROBLEM OCCURRENCE HISTORY INFOR-MATION
S154
S155
NOTIFY PROBLEM OCCURRENCE HISTORY INFORMATION ACQUISITION RESULT
S156
HOLD PROBLEM OCCURRENCE HISTORY INFORMATION
S157
S158
FILE UPLOAD REQUEST
S159
FILE UPLOAD REQUEST
S160
FILE UPLOAD REQUEST
S161
TRANSFER DESTINATION DETERMIN-ING PROCESS
S162
S163
S164
ACQUIRE TRANSFER DESTI-NATION INFORMATION
S165
REQUEST TO SERVER
REQUEST TO SERVER
S166
S167
S168
RESPONSE
S169
RESPONSE
S170
RESPONSE
S171

IMAGE FORMING APPARATUS, INFORMATION PROCESSING SYSTEM, AND NON-TRANSITORY COMPUTER-READABLE MEDIUM

CROSS-REFERENCE TO RELATED APPLICATIONS

The present application claims priority to and incorporates by reference the entire contents of Japanese Patent Application No. 2015-008797 filed in Japan on Jan. 20, 2015.

BACKGROUND OF THE INVENTION

1. Field of the Invention

The present invention relates to an image forming apparatus, an information processing system, and a non-transitory computer-readable medium.

2. Description of the Related Art

Today, a multifunction peripheral (MFP) which may be operated from a portable terminal device such as a smartphone and a tablet terminal device, for example, is known. Setting of the MFP and execution of a job of such MFP may be operated by the portable terminal device. Therefore, it is possible to operate various types of MFPs with different panel operation by one portable terminal device. Even the MFP provided with an operation panel with poor operability such as a so-called four-line panel may be operated excellently by using the portable terminal device.

Today, BYOD (bring your own device) to allow an employee to use an individually-owned portable terminal device for work in office is also known. When the BYOD is allowed, the office should secure security of a system. Therefore, when the MFP of the office is operated by the individually-owned portable terminal device, authentication information is transmitted from the portable terminal device to the MFP. The MFP transmits the authentication information from the portable terminal device to an authentication server device. The MFP allows its operation by the portable terminal device when the authentication server device authenticates that a user is a registered user.

Japanese Laid-open Patent Publication No. 2013-190864 discloses an information processing system in which an operational load of the user is reduced. In this information processing system, when a portable terminal starts wireless communication with the MFP, a password for connection input by the user is transmitted to the MFP. When it is authenticated that the user is the registered user by the password for connection in the MFP, the MFP allows the wireless communication of the portable terminal. The portable terminal transmits the authentication information required for access to a server device to the MFP through the wireless communication and requests the MFP to access the server device.

The MFP transmits the authentication information received from the portable terminal to the server device through a first network to issue an access request. The server device performs the user authentication by using the authentication information received from the MFP and allows the access by the MFP when the user is authenticated as the registered user. According to this, the operational load of the user is reduced.

In a case of the information processing system in the conventional method and that disclosed in Japanese Laid-open Patent Publication No. 2013-190864, the authentication information transmitted from the portable terminal device is directly transmitted to the authentication server device through the MFP.

Therefore, when a malicious request is transmitted from the portable terminal device, this is directly transmitted to the authentication server device, so that the information processing system in the conventional method and that disclosed in Japanese Laid-open Patent Publication No. 2013-190864 have a security problem.

Therefore, it is desirable to provide an image forming apparatus, an information processing system, and a non-transitory computer-readable medium enabling a communication between a portable terminal device and another device connected to a network through an intermediating device connected to a predetermined network while securing security of the network.

SUMMARY OF THE INVENTION

It is an object of the present invention to at least partially solve the problems in the conventional technology.

According to an aspect of the present invention, there is provided an image forming apparatus including: a communicating unit which communicates with a portable terminal device and an external device; a storage control unit which controls to store transfer destination information of the external device to which information from the portable terminal device is allowed to be transferred in a storage unit; a determining unit which determines whether a request from the portable terminal device is the request to the external device indicated by the transfer destination information stored in the storage unit; and a communication control unit which controls the communicating unit to transfer the request from the portable terminal device to the external device indicated by the transfer destination information when the determining unit determines that the request is the request to the external device indicated by the transfer destination information.

According to another aspect of the present invention, there is provided an information processing system including: a portable terminal device which issues a desired request through a communicating unit; an external device which processes the request from the portable terminal device; and an image forming apparatus which intermediates communication between the portable terminal device and the external device, wherein the image forming apparatus includes: a communicating unit which communicates with the portable terminal device and the external device; a storage control unit which controls to store transfer destination information of the external device to which information from the portable terminal device is allowed to be transferred in a storage unit; a determining unit which determines whether the request from the portable terminal device is the request to the external device indicated by the transfer destination stored in the storage unit; and a communication control unit which controls the communicating unit to transfer the request from the portable terminal device to the external device indicated by the transfer destination information when the determining unit determines that the request is the request to the external device indicated by the transfer destination information.

According to another aspect of the present invention, there is provided a non-transitory computer-readable medium including computer readable program codes, performed by a computer, the program codes when executed causing the computer to execute: controlling to store transfer destination information of an external device to which information from a portable terminal device is allowed to be transferred in a storage unit; determining whether a request from the portable terminal device is the request to the external device indicated by the transfer destination information stored in the storage unit; and controlling a communicating unit to transfer the request from the portable terminal device to the external device indicated by the transfer destination information when the determining determines that the request is the request to the external device indicated by the transfer destination information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a sequence diagram illustrating a flow of registration of a private IP address of the server device to which a request from the portable terminal device is transferred and requesting operation from the portable terminal device to the server device in the information processing system of the first embodiment;

FIG. 11 is a view illustrating a database used for determining a transfer destination of the request from the portable terminal device stored in the MFP of the information processing system of the first embodiment;

FIG. 12 is a view illustrating a security level assigned to each request from a portable terminal device stored in an MFP of an information processing system of a second embodiment;

FIG. 13 is a view illustrating an example of role check information set for each authority stored in an MFP of an information processing system of a third embodiment;

FIG. 14 is a view illustrating an individual security level of each user stored in an MFP of an information processing system of a fourth embodiment;

FIG. 15 is a view illustrating a security level set for each authority of a user stored in an MFP of an information processing system of a fifth embodiment;

FIG. 19 is a sequence diagram illustrating a flow of prohibiting operation of an API and a user in an information processing system being a ninth embodiment;

FIG. 21 is flowchart illustrating a flow of collecting response information from a server device 3 in an information processing system being an eleventh embodiment;

FIG. 24 is a sequence diagram illustrating a flow of operation to share information indicating a request from a portable terminal device in which a problem in processing occurs among a plurality of MFPs in an information processing system being a thirteenth embodiment.

DETAILED DESCRIPTION OF THE PREFERRED EMBODIMENTS

An information processing system being an embodiment to which the present invention is applied is hereinafter described.

First Embodiment

Figure 1:
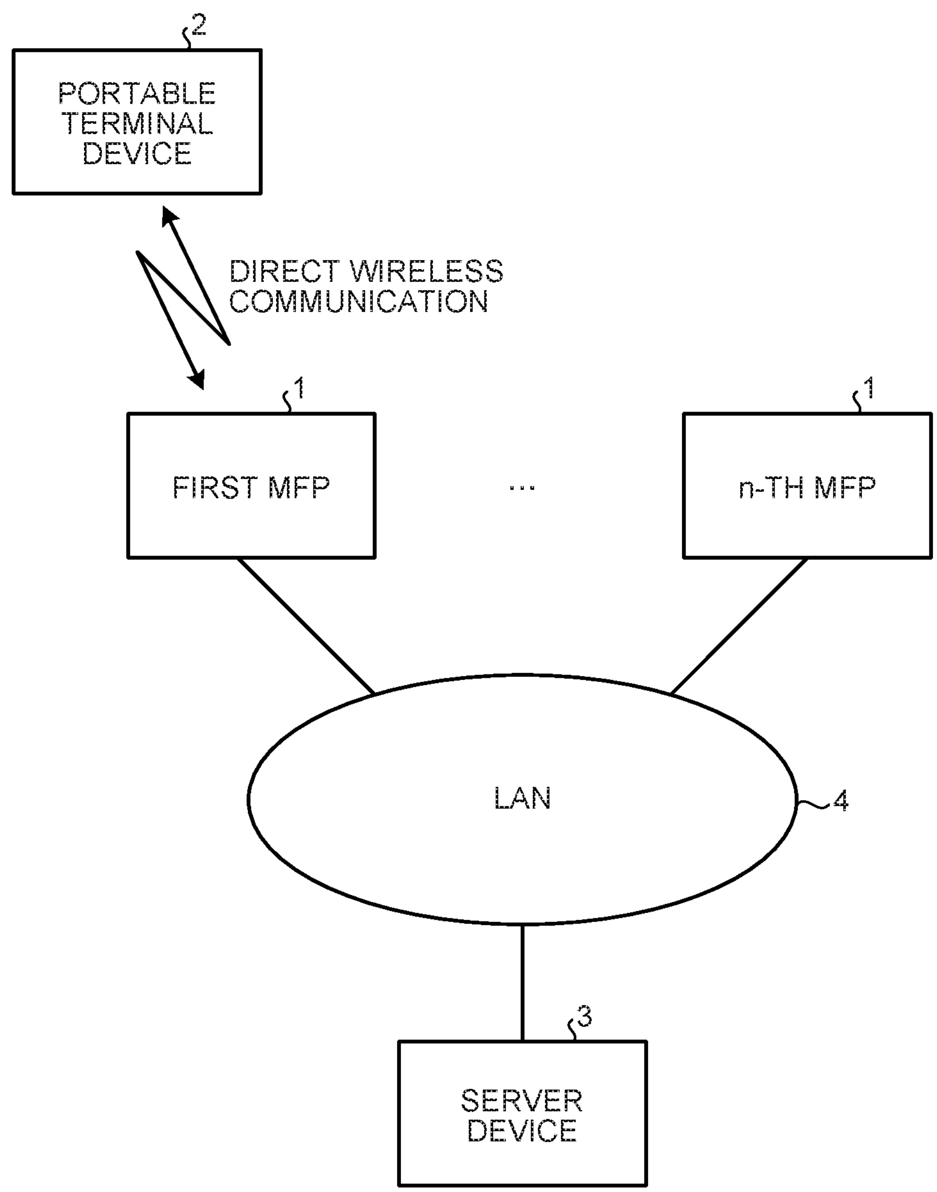
FIG. 1 is a system configuration diagram of an information processing system of a first embodiment.

FIG. 1 is a system configuration diagram of an information processing system of a first embodiment. As illustrated in FIG. 1, the information processing system of the first embodiment includes a multifunction peripheral (MFP) 1, a portable terminal device 2, and a server device 3. One or a plurality of MFPs 1, portable terminal devices 2, and server devices 3 are provided. In an example in FIG. 1, a plurality of MFPs 1 is provided and one portable terminal device 2 and one server device 3 are provided. The server device 3 is an example of an external device.

The MFPs 1 are connected to one another through a local area network (LAN) 4, for example. Each of the MFPs 1 is connected to the server device 3 through the LAN 4. The portable terminal device 2 communicates with any MFP 1 through direct wireless communication such as Wi-Fi Direct™, for example.

Figure 2:
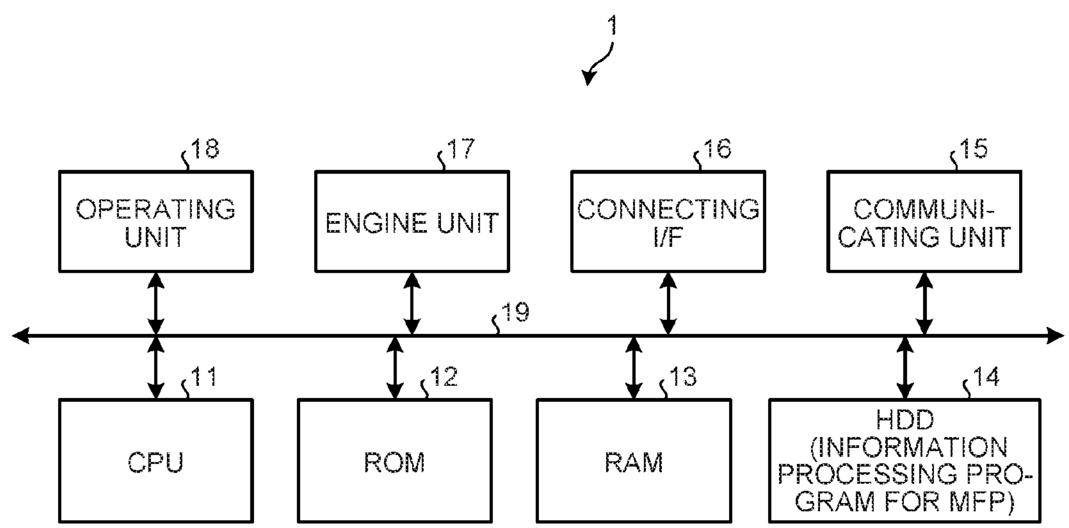
FIG. 2 is a hardware configuration diagram of an MFP provided in the information processing system of the first embodiment.

FIG. 2 is a hardware configuration diagram of the MFP 1. As illustrated in FIG. 2, the MFP 1 includes a CPU 11, a ROM 12, a RAM 13, a HDD 14, a communicating unit 15, a connecting unit 16, an engine unit 17, and an operating unit 18. The units from the CPU 11 to the operating unit 18 are connected to one another through a system bus 19. The engine unit 17 is an example of a processor.

The CPU 11 integrally controls operation of the MFP 1. The CPU 11 realizes functions such as a copy function, a scanner function, a facsimile function, and a printer function, for example, by executing an OS and various application programs stored in the ROM 12, the HDD 14 or the like by using the RAM 13 as a work area. The OS is an abbreviation of an "operating system". The ROM is an abbreviation of a "read only memory".

An information processing program for MFP is stored in the HDD 14. As described later, the CPU 11 operates according to the information processing program for MFP, thereby enabling the operation of the MFP 1 by the portable terminal device 2 while securing security. Meanwhile, the information processing program for MFP may also be stored in the ROM 12 or the RAM 13. The communicating unit 15 enables wired communication through the LAN 4 with the server device 3 in addition to wireless communication such as the Wi-Fi Direct™ with the portable terminal device 2.

The engine unit 17 is hardware which performs versatile information processing and processing other than communication processing for realizing the copy function, the scanner function, the facsimile function, and the printer function. The engine unit 17 is provided with a scanner (image reading unit) which scans to read an image of a document, a plotter (image forming unit) which prints on a sheet material such as paper, a facsimile communicating unit which performs facsimile communication and the like, for example. This may further include a specific option such as a finisher which sorts printed sheet materials and an ADF (automatic document feeder) which automatically feeds the document.

The operating unit 18 is formed of a liquid crystal display device (LCD), an organic EL display device or the like having a touch panel function. That is to say, the operating unit 18 has an input operation function and a display function. A user performs input operation and the like of a private IP address of the server device in the LAN 4 to which a request from the portable terminal device 2 is transferred by operating the operating unit 18. Meanwhile, in this example, it is described supposing that the user inputs the private IP address of the server device in the LAN 4 through the operating unit 18. However, it is also possible to input a global IP address of the server device in a WAN such as the Internet through the operating unit 18. The WAN is an abbreviation of a "wide area network".

Figure 3:
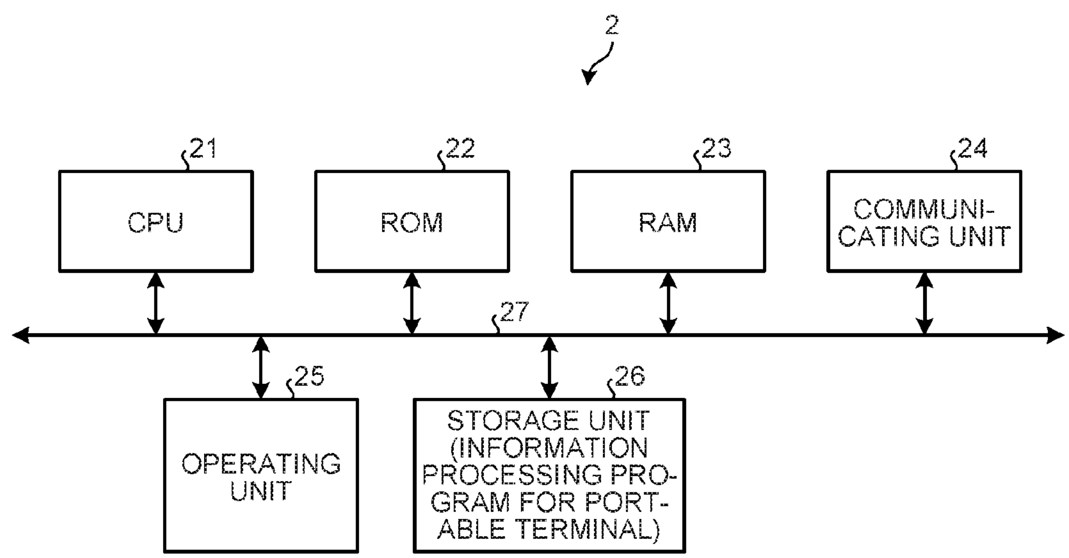
FIG. 3 is a hardware configuration diagram of a portable terminal device provided in the information processing system of the first embodiment.

FIG. 3 is a hardware configuration diagram of the portable terminal device 2. As illustrated in FIG. 3, the portable terminal device 2 includes a CPU 21, a ROM 22, a RAM 23, a communicating unit 24, an operating unit 25, and a storage unit 26. The units from the CPU 21 to the storage unit 26 are connected to one another through a system bus 27.

The CPU 21 integrally controls operation of the portable terminal device 2. The CPU 21 executes an OS and various application programs stored in the ROM 22, the storage unit 26 or the like by using the RAM 23 as a work area. The storage unit 26 is a semiconductor memory in which an information processing program for portable terminal to be described later and the like is stored. As described later, the CPU 21 operates according to the information processing program for portable terminal to transmit an operation command, a request to transfer desired data and the like, for example, to the MFP 1 and the server device 3. Meanwhile, the information processing program for portable terminal may also be stored in the ROM 22 or the RAM 23. The communicating unit 24 performs the wireless communication such as the Wi-Fi Direct™ with the MFP 1.

The operating unit 25 is formed of a liquid crystal display device (LCD), an organic EL display device or the like having a touch panel function. That is to say, the operating unit 25 has an input operation function and a display function. The user operates the operating unit 25 to input the operation command, the request to transfer the desired data and the like, for example.

Figure 4:
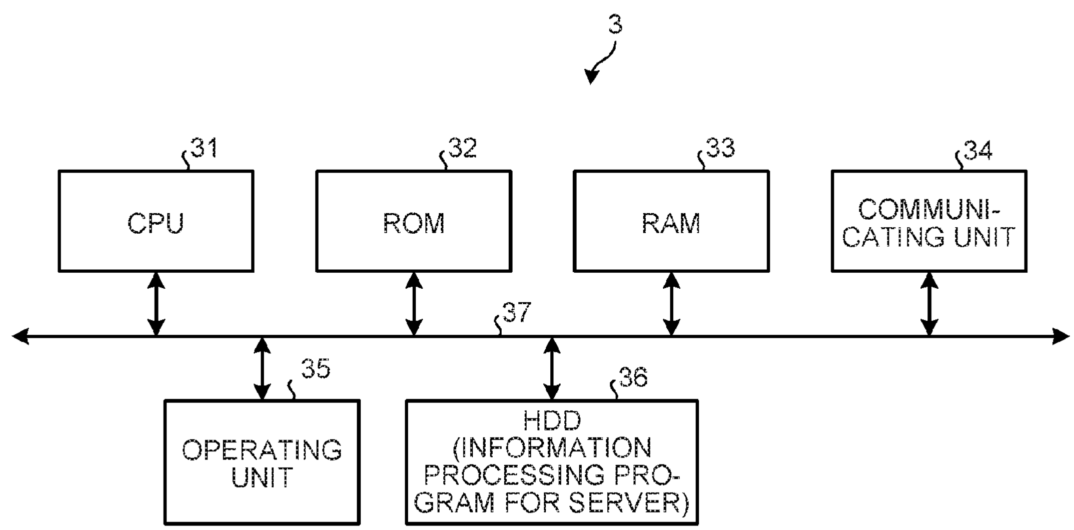
FIG. 4 is a hardware configuration diagram of a server device provided in the information processing system of the first embodiment.

FIG. 4 is a hardware configuration diagram of the server device 3. As illustrated in FIG. 4, the server device 3 includes a CPU 31, a ROM 32, a RAM 33, a communicating unit 34, an operating unit 35, and a HDD 36. The units from the CPU 31 to the HDD 36 are connected to one another through a system bus 37.

The CPU 31 integrally controls operation of the server device 3. The CPU 31 executes an OS and various application programs stored in the ROM 32, the HDD 36 or the like by using the RAM 33 as a work area. An information processing program for server to be described later and the like is stored in the HDD 36. As described later, the CPU 31 operates according to the information processing program for server to transmit information requested by the MFP 1 or the portable terminal device 2. Meanwhile, the information processing program for server may also be stored in the ROM 32 or the RAM 33. The communicating unit 34 performs the wired communication through the LAN 4 with the MFP 1. A keyboard, a mouse device and the like are provided, for example, as the operating unit 35.

Figure 5:
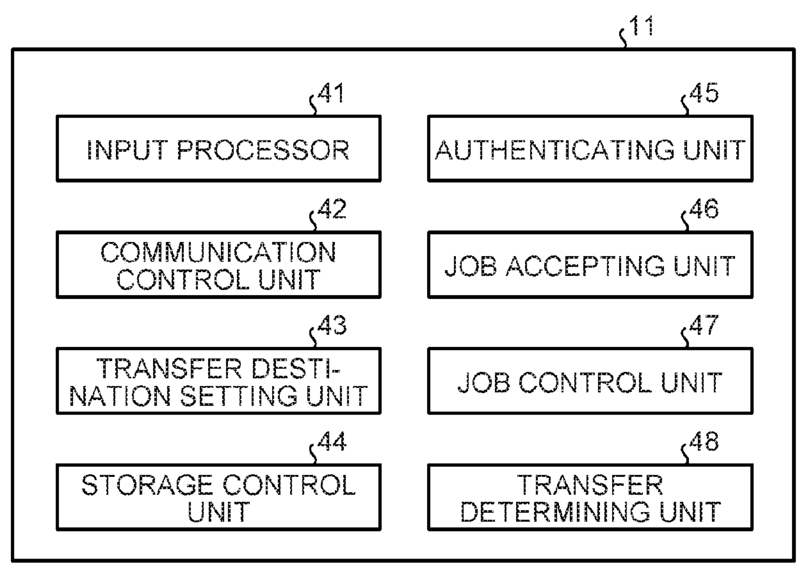
FIG. 5 is a functional block diagram of the MFP provided in the information processing system of the first embodiment.

FIG. 5 is a functional block diagram illustrating each function realized by execution of the information processing program for MFP by the CPU 11 of the MFP 1. As illustrated in FIG. 5, the CPU 11 serves as an input processor 41, a communication control unit 42, a transfer destination setting unit 43, and a storage control unit 44 by executing the information processing program for MFP. The CPU 11 serves as an authenticating unit 45, a job accepting unit 46, a job control unit 47, and a transfer determining unit 48 by executing the information processing program for MFP. The transfer determining unit 48 is an example of a determining unit.

Meanwhile, it is described supposing that the units from the input processor 41 to the transfer determining unit 48 are realized by software in this example. However, a part or all of the units from the input processor 41 to the transfer determining unit 48 may be realized by hardware.

The information processing program for MFP may also be recorded in a computer readable recording medium such as a CD-ROM and a flexible disk (FD) as a file in an installable format or an executable format to be provided. The information processing program for MFP may also be recorded in the computer readable recording medium such as a CD-R, a DVD, a Blu-ray Disk™, and a semiconductor memory to be provided. The DVD is an abbreviation of a "digital versatile disk". The information processing program for MFP may also be provided through a network such as the Internet. The MFP 1 may also download the information processing program for MFP through the network and install the same in the HDD 14 and the like to execute. It is also possible to preinstall the information processing program for MFP in the ROM 12 and the like in the MFP 1 to provide.

The input processor 41 requests setting of transfer destination information to be described later and the like. The communication control unit 42 controls the communicating unit such as a network interface card (NIC), for example, to communicate a request and a response to the portable terminal device 2 and the server device 3. The transfer destination setting unit 43 sets the transfer destination information by an instruction from an authorized user authenticated by user authentication.

The storage control unit 44 controls to store an address of the server device 3 which becomes a transfer destination and information for determining whether it is possible to transfer in the HDD 14 and the like. The storage control unit 44 controls to store address book information of the user authentication and security level information for each log-in user in the HDD 14 and the like. The storage control unit 44 stores table information of a request transfer destination, a keyword of the request transfer destination, a value of security level setting, security check information for each request, information of prohibited data and the like in the HDD 14.

The authenticating unit 45 performs a user authenticating process by using a user account input from the portable terminal device 2. The job accepting unit 46 accepts an execution request of setting and execution of a job processed in the MFP 1 such as reading and printing, display of a device state and the like. The job control unit 47 sets and executes a job request of the reading and printing from the job accepting unit 46. The transfer determining unit 48 determines whether it is possible to communicate the request from the portable terminal device 2 to the server device 3, to process the same by the MFP 1, and to accept the request.

Figure 6:
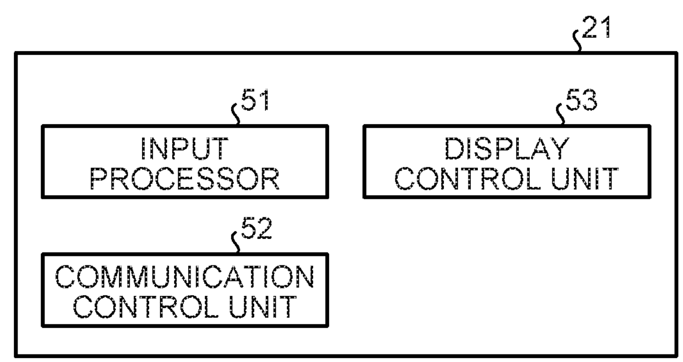
FIG. 6 is a functional block diagram of the portable terminal device provided in the information processing system of the first embodiment.

FIG. 6 is a functional block diagram illustrating each function realized by execution of the information processing program for portable terminal by the CPU 21 of the portable terminal device 2. As illustrated in FIG. 6, the CPU 21 serves as an input processor 51, a communication control unit 52, and a display control unit 53 by executing the information processing program for portable terminal.

Meanwhile, it is described supposing that the units from the input processor 51 to the display control unit 53 are realized by software in this example. However, a part or all of the units from the input processor 51 to the display control unit 53 may be realized by hardware.

The information processing program for portable terminal may also be recorded in the computer readable recording medium such as the CD-ROM and the flexible disk (FD) as the file in the installable format or executable format to be provided. The information processing program for portable terminal may also be recorded in the computer readable recording medium such as the CD-R, the DVD, the Blu-ray Disk™ and the semiconductor memory to be provided. The DVD is an abbreviation of a "digital versatile disk". The information processing program for portable terminal may also be provided through the network such as the Internet. The portable terminal device 2 may also download the information processing program for portable terminal through the network and install the same in the storage unit 26 and the like to execute. It is also possible to preinstall the information processing program for portable terminal in the ROM 12 and the like in the MFP 1 to provide.

The input processor 51 inputs a predetermined request to the MFP 1 and the server device 3 on the portable terminal device 2. The communication control unit 52 controls the communicating unit 24 to communicate the request and the response to the MFP 1. The display control unit 53 displays a screen on the portable terminal device 2.

Figure 7:
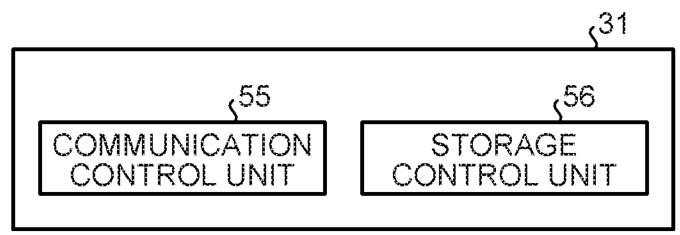
FIG. 7 is a functional block diagram of the server device provided in the information processing system of the first embodiment.

FIG. 7 is a functional block diagram illustrating each function realized by execution of the information processing program for server by the CPU 31 of the server device 3. As illustrated in FIG. 7, the CPU 31 serves as a communication control unit 55 and a storage control unit 56 by executing the information processing program for server.

Meanwhile, it is described supposing that the communication control unit 55 and the storage control unit 56 are realized by software in this example. However, a part or all of the communication control unit 55 and the storage control unit 56 may also be realized by hardware.

The information processing program for server may also be recorded in the computer readable recording medium such as the CD-ROM and the flexible disk (FD) as the file in the installable format or the executable format to be provided. The information processing program for server may also be recorded in the computer readable recording medium such as the CD-R, the DVD, the Blu-ray Disk™, and the semiconductor memory to be provided. The DVD is an abbreviation of a "digital versatile disk". The information processing program for server may also be provided through the network such as the Internet. The server device 3 may also download the information processing program for server through the network and install the same in the storage unit 26 and the like to execute. It is also possible to preinstall the information processing program for server in the ROM 12 and the like in the server device 3 to provide.

The communication control unit 55 controls the communicating unit such as the network interface card (NIC), for example, to communicate the request and the response with the MFP 1. The storage control unit 56 controls writing and reading of the information in and from the HDD 36 and the like.

Such information processing system has a communication environment in which the portable terminal device 2 is connected to the MFP 1 through the wireless communication and accesses an in-house server device 3 through the MFP 1. The portable terminal device 2 cannot be connected to an in-house LAN 4 and this communicates wirelessly with the MFP 1 through the WiFi Direct™, for example.

Information of an address book and the like is stored in the in-house server device 3. When the user of the portable terminal device 2 wants to use the address book, the user accesses the in-house server device 3 from the portable terminal device 2 through the MFP 1. At that time, the portable terminal device 2 is allowed to access only the server device which becomes a connecting destination the address of which is stored in the MFP 1. According to this, it is possible to prevent disadvantage of illegal access from the portable terminal device 2 to another in-house server device.

The request to the MFP 1 such as execution of the scanner, for example, the request to the server device 3, and an illegal request are determined and the request is appropriately transferred or is stopped. According to this, it is possible to satisfy both the setting and execution of the job by the MFP 1 and prevention of the illegal access to the server device 3.

FIG. 8 is a sequence diagram illustrating a flow of registration of the private IP address of the server device 3 to which the request from the portable terminal device 2 is transferred and requesting operation from the portable terminal device 2 to the server device 3. At step S1 in FIG. 8, an instruction to set the private IP address (10.12.33.44) in the LAN 4 of a desired server device 3 to which the request is transferred is acquired through the input processor 41 of the MFP 1. Meanwhile, it is also possible that the server device 3 or the portable terminal device 2 indicates the private IP address of the desired server device 3.

The transfer destination information being the private IP address of the desired server device 3 is transferred from the communication control unit 42 to the transfer destination setting unit 43 (step S2). When the transfer destination information is transferred, the transfer destination setting unit 43 communicates with the authenticating unit 45 to determine whether the user who logs in or a one-shot authenticated user indicated through the communicating unit 15 is an administrator (steps S3 and S4). When the user who logs in or the one-shot authenticated user is authenticated as the administrator, the transfer destination setting unit 43 transfers the transferred transfer destination information to the storage control unit 44 and the storage control unit 44 controls to store the transfer destination information in the HDD 14 and the like (step S5). It is possible to limit the access of the portable terminal device 2 only to the server device 3 desired by the administrator by this setting.

On the other hand, when the user who logs in or the one-shot authenticated user is not authenticated as the administrator, an error occurs and the transfer destination setting unit 43 does not set the transfer destination information. The transfer destination setting unit 43 notifies the user that the transfer destination information is set or this is not set (steps S6 and S7).

When the transfer destination information of the desired server device 3 indicating the transfer destination of the request is registered, the user of the portable terminal device 2 may transmit a desired request. That is to say, the request is transmitted from the portable terminal device 2 to the MFP 1 through the input processor 51 and the communicating unit 24 controlled by the communication control unit 52 of the portable terminal device 2 (steps S8 and S9). The request from the portable terminal device 2 is transferred from the communication control unit 42 to the transfer determining unit 48 of the MFP 1 (step S10).

The transfer determining unit 48 acquires the transfer destination information stored in the HDD 14 and the like in advance through the storage control unit 44 (steps S11 and S12) and transfers the same to the communication control unit 42 (step S13). The communication control unit 42 controls the communicating unit 15 to transmit the request from the portable terminal device 2 to the server device 3 having the private IP address indicated by the transfer destination information (step S14). According to this, it is possible to limit the access of the portable terminal device 2 only to the server device 3 desired by the administrator (only to the server device 3 having the private IP address registered in advance).

Figure 9:
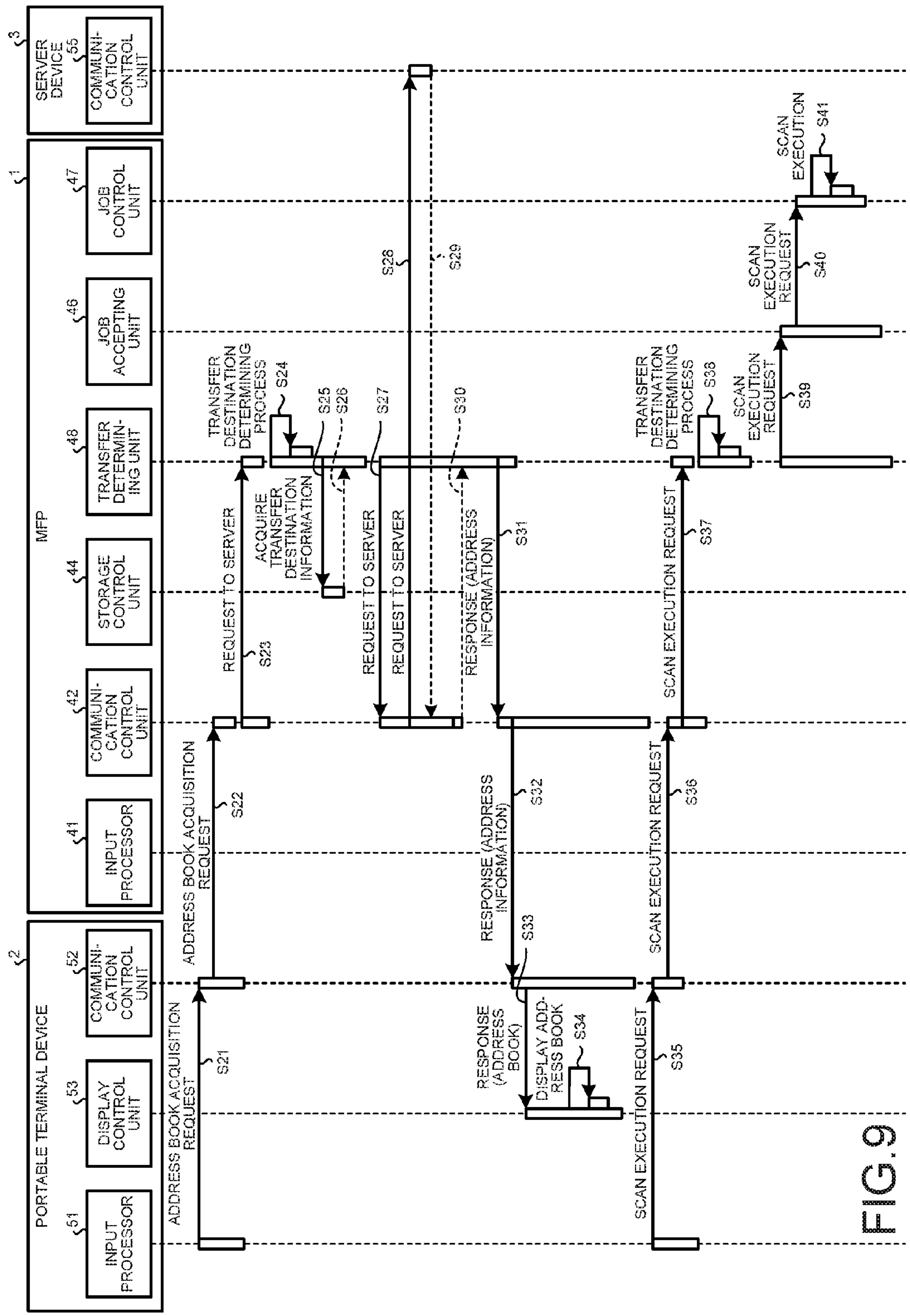
FIG. 9 is a sequence diagram illustrating a flow in which the portable terminal device acquires address book information and a flow in which operation of the MFP to execute scan by a scan execution request is allowed in the information processing system of the first embodiment.

FIG. 9 is a sequence diagram illustrating a flow in which the portable terminal device acquires the address book information and a flow in which operation of the MFP 1 to execute scan by a scan execution request is allowed. When an address book acquisition request is issued by operation of the operating unit 25 of the portable terminal device 2, the address book acquisition request is transmitted from the input processor 51 to the MFP 1 through the communicating unit 24 controlled by the communication control unit 52 (steps S21 and S22). The MFP 1 receives the address book acquisition request from the portable terminal device 2 by the communicating unit 15 controlled by the communication control unit 42 and transfers the same to the transfer determining unit 48 (step S23).

The transfer determining unit 48 performs a transfer destination determining process to be described later (step S24). As a result of the determination, when the request is the request to the server device 3, the transfer determining unit 48 acquires the transfer destination information indicating the server device which becomes the transfer destination from the storage control unit 44 (steps S25 and S26). The communication control unit 42 controls the communicating unit 15 to transfer the address book acquisition request to the server device indicated by the transfer destination information (steps S27 to S29).

The server device 3 transmits the address book information to the MFP 1 in response to the address book acquisition request (step S29). The MFP 1 acquires the address book from the server device 3 by the communicating unit 15 controlled by the communication control unit 42 (step S30). Then, the transfer determining unit 48 transmits the acquired address book to the portable terminal device 2 through the communicating unit 15 controlled by the communication control unit 42 (steps S31 and S32).

The portable terminal device 2 acquires the address book information transmitted from the MFP 1 by the communicating unit 24 controlled by the communication control unit 52 and the display control unit 53 displays the same on the operating unit 25 integrated with a display unit (steps S33 and S34)

When the user of the portable terminal device 2 issues the scan execution request by operating the operating unit 25, the scan execution request is transmitted from the input processor 51 to the MFP 1 through the communicating unit 24 controlled by the communication control unit 52 (steps S35 and S36). The MFP 1 receives the scan execution request from the portable terminal device 2 by the communicating unit 15 controlled by the communication control unit 42 and transfers the same to the transfer determining unit 48 (step S37).

The transfer determining unit 48 performs the transfer destination determining process to be described later (step S38). As a result of the determination, when the request is the request to the MFP 1, the transfer determining unit 48 transfers the scan execution request to the job accepting unit 46 (step S39). The job accepting unit 46 transfers the scan execution request to the job control unit 47 (step S40). According to this, the MFP 1 executes the scan in response to the scan execution request from the portable terminal device 2 (step S41).

Figure 10:
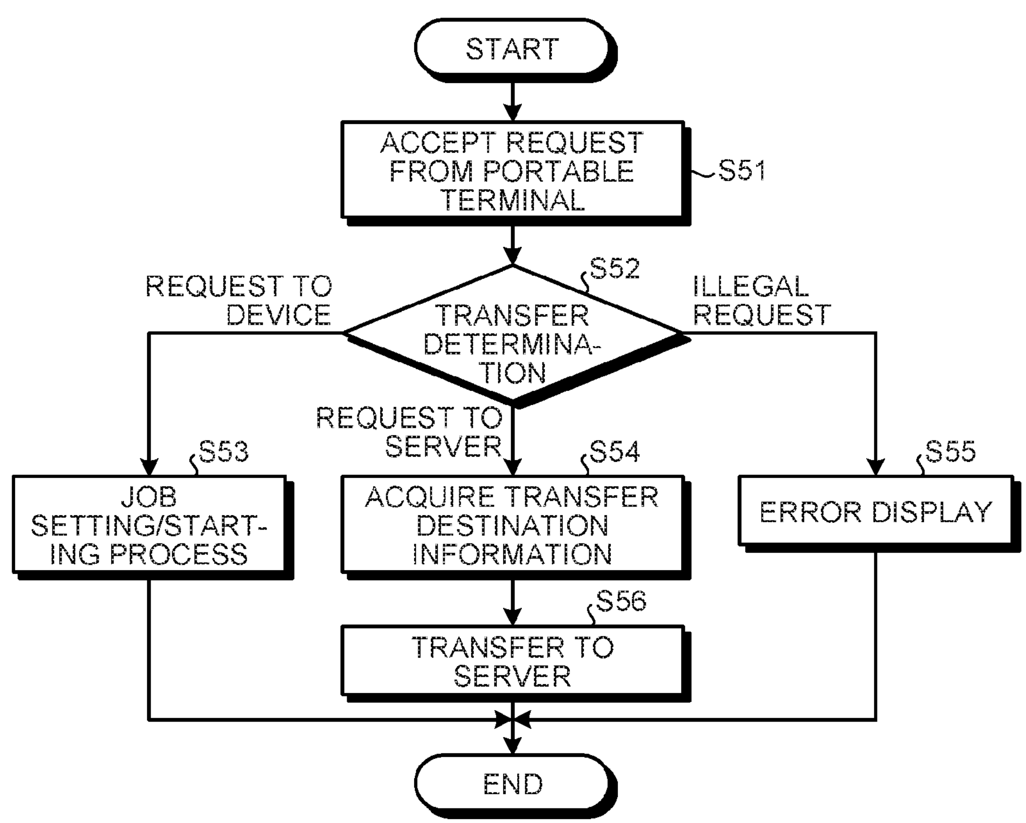
FIG. 10 is a flowchart illustrating a flow of a process according to a transfer determination result by a transfer determining unit of the MFP in the information processing system of the first embodiment.

FIG. 10 is a flowchart illustrating a flow of a process according to a transfer determination result by the transfer determining unit 48 of the MFP 1. The communication control unit 42 of the MFP 1 accepts the request from the portable terminal device 2 through the communicating unit 15 through the wireless communication such as the WiFi Direct™ and transfers the same to the transfer determining unit 48 (step S51). The transfer determining unit 48 performs the transfer destination determining process to be described later at step S52. When the determination result is the request to the MFP 1, the request is transferred to the job accepting unit 46 in the MFP 1 and the job control unit 47 performs a process to set the job and start the job corresponding to the request at step S53.

On the other hand, when the transfer determination result is the request to the server device 3, the address of the server device 3 set as the transfer destination (the above-described transfer destination information) is acquired at step S54. Then, at step S56, the request from the portable terminal device 2 is transferred to the server device 3 indicated by the transfer destination information.

On the other hand, when the transfer determination result is the illegal request, the CPU 11 discards the request from the portable terminal device 2 at step S55. Then, the CPU 11 displays an error display on the operating unit 18 integrated with the display unit.

FIG. 11 illustrates a database used for determining the transfer destination of the request from the portable terminal device 2. The database in which an API (application programming interface) requested by the portable terminal device 2 and the device which becomes a destination of the API (MFP 1 or server device 3) are associated with each other is stored in the HDD 14 of the MFP 1. The transfer determining unit 48 checks the request from the portable terminal device 2 against the database. Then, the transfer determining unit 48 performs transfer determination by detecting the transfer destination corresponding to the request from the portable terminal device 2.

When the request from the portable terminal device 2 is the API of "GET/mfp/scan/bb_state", for example, the transfer determining unit 48 determines the same as the request to the MFP 1. When the request from the portable terminal device 2 is the API of "GET/server/address", for example, the transfer determining unit 48 determines the same as the request to the server device 3. Meanwhile, when the request is that with no corresponding transfer destination, the transfer determining unit 48 determines the same as the illegal request.

In the description above, the MFP 1 includes the database in the HDD 14. However, it is also possible to determine the transfer destination by detecting a keyword in the API of the request from the portable terminal device 2 also when there is no database. That is to say, the API of the request from the portable terminal device 2 includes the keyword indicating the transfer destination of the request such as "mfp" or "server" as illustrated in FIG. 11. The transfer determining unit 48 detects such keyword from the API to determine the transfer destination of the request. For example, when the API includes the keyword of "mfp/", this is determined to be the request to the MFP 1. When the API includes the keyword of "server/", this is determined to be the request to the server device 3. Meanwhile, a list of the keywords may be stored in the storage unit such as the HDD 14. When the keyword cannot be detected from the API, the transfer determining unit 48 determines that the request is illegal.

If authentication information transmitted from the portable terminal device 2 may be directly transmitted to the server device 3 through the MFP 1, the authentication information including a malicious script is also directly transmitted to the server device 3. If the portable terminal device 2 may substantially directly access the server device 3 although there is intermediation by the MFP 1, it becomes possible to intentionally stop the operation of the server device 3 by continuously transmitting a lot of requests to the server device 3.

However, the information processing system of the first embodiment registers the server device 3 to which the request from the portable terminal device 2 is transferred in the MFP 1 in advance. When there is the request from the portable terminal device 2, the MFP 1 transfers the request only to the server device 3 registered in advance. According to this, it is possible to limit the communication of the portable terminal device 2 only to the server device 3 registered in advance and prevent the disadvantage of the illegal access from the portable terminal device 2 to another server device.

The information processing system of the first embodiment determines the request to the MFP 1 such as the execution of the scanner, for example, and the illegal request to the server device 3 and appropriately transfers the request or stops transferring the request. According to this, it is possible to satisfy both the setting and execution of the job of the MFP 1 and the prevention of the illegal access to the server device 3. Therefore, the information processing system of the first embodiment may enable the communication between the portable terminal device 2 and the server device 3 connected to the LAN 4 through the MFP 1 connected to the LAN 4 while securing security of the LAN 4.

Second Embodiment

An information processing system being a second embodiment is next described. In the information processing system of the second embodiment, a security level is added to each request from a portable terminal device 2. The security level of the request allowed to be transferred to a server device 3 is specified through an operating unit 18 of an MFP 1. Only the request with the security level not lower than the security level specified for the server device 3 is transferred to the server device 3. According to this, it is possible to improve the security level of the information processing system.

Specifically, the security level (security check information) is added to each request transmitted from the portable terminal device 2 to the MFP 1 as illustrated in FIG. 12. A predetermined level out of levels 1 to 3 is assigned to each request as the security level. The levels of security are level 1, level 2, and level 3 from the highest one in descending order.

In a case of the information processing system of the second embodiment, it is possible to specify the security level of the request allowed to be transferred to the server device 3 for each server device 3 through the operating unit 18 of the MFP 1. Specified level information indicating the security level of the request allowed to be transferred to the server device 3 is stored in a HDD 14 of the MFP 1. The security level may also be specified from the portable terminal device 2 or a device having a communication function such as a personal computer device.

When the request is transferred from the portable terminal device 2, a transfer determining unit 48 of the MFP 1 refers to the security check information stored in the HDD 14 to determine the security level of the request transferred from the portable terminal device 2. The transfer determining unit 48 refers to the specified level information in the HDD 14 to determine the security level of the request allowed to be transferred to the server device 3 to which the request is transferred. When the transfer determining unit 48 determines that the security of the request transferred from the portable terminal device 2 is not lower than the security level of the request allowed to be transferred to the server device 3, a communication control unit 42 transfers the request from the portable terminal device 2 to the server device 3.

For example, when the security level of the request allowed to be transferred to the server device 3 is "1" and the security level of the request transferred from the portable terminal device 2 is "1", the transfer determining unit 48 determines that the request from the portable terminal device 2 may be transferred to the server device 3. Also when the security level of the request allowed to be transferred to the server device 3 is "2" and the security level of the request transferred from the portable terminal device 2 is "2" or "1", the transfer determining unit 48 determines that the request from the portable terminal device 2 may be transferred to the server device 3.

On the other hand, when the security level of the request allowed to be transferred to the server device 3 is "1" and the security level of the request transferred from the portable terminal device 2 is "2", the transfer determining unit 48 determines that the request from the portable terminal device 2 cannot be transferred to the server device 3.

The communication control unit 42 is notified of a determination result of the transfer determining unit 48. When the communication control unit 42 is notified of the determination result indicating that the request may be transferred from the transfer determining unit 48, this controls a communicating unit 15 to transfer the request from the portable terminal device 2 to the server device 3. When this is notified of the determination result indicating that the request cannot be transferred from the transfer determining unit 48, the transfer of the request from the portable terminal device 2 to the server device 3 is prohibited. When the communication control unit 42 is notified of the determination result indicating that the request cannot be transferred from the transfer determining unit 48, this discards the request from the portable terminal device 2. The communication control unit 42 transmits a warning text including an error message indicating that the request is illegal to the portable terminal device 2 through the communicating unit 15.

In this manner, the information processing system of the second embodiment transfers only the request with the security level not lower than the security level specified for the server device 3 to the server device 3. According to this, it is possible to improve the security level of the information processing system and acquire an effect similar to that of the above-described embodiment.

Third Embodiment

An information processing system being a third embodiment is next described. The information processing system of the third embodiment stores role check information indicating whether each request may be transferred for each authority (role) of a user of a portable terminal device 2 who logs in such as a general user, a user administrator, or a device administrator, for example, in a storage unit such as a HDD 14 of an MFP 1. Then, a transfer determining unit 48 transfers only the request allowed for the role to a server device 3 indicated by transfer destination information described above.

Specifically, FIG. 13 is a view illustrating an example of the role check information set for each role. A circle in FIG. 13 indicates that the request may be transferred. A cross mark in FIG. 13 indicates that the request cannot be transferred (transfer prohibited). In a case of the example illustrated in FIG. 13, the device administrator is allowed to transfer all the requests. When the role of the request received from the portable terminal device 2 is the device administrator, the transfer determining unit 48 determines that all the requests may be transferred.

In the example in FIG. 13, when the role of the request received from the portable terminal device 2 is the user administrator, the transfer determining unit 48 determines that an address book acquisition request, a state acquisition request, an address sender write request, and an address user name write request may be transferred. In the example in FIG. 13, when the role of the request received from the portable terminal device 2 is the general user, the transfer determining unit 48 determines that the request other than the address book acquisition request and the state acquisition request cannot be transferred. A communication control unit 42 transfers only the request allowed for the role of the user of the portable terminal device 2 to the server device 3 through a communicating unit 15.

Such information processing system of the third embodiment may transfer only the request allowed for the role to the server device 3. According to this, it is possible to improve security of the information processing system and acquire an effect similar to that of the above-described embodiments.

Fourth Embodiment

An information processing system being a fourth embodiment is next described. The information processing system of the fourth embodiment assigns a security level to each user who logs in and stores the same in a storage unit such as a HDD 14 of an MFP 1. Then, this checks the same against the security level of each request described with reference to FIG. 12 and transfers only the request with the security level not higher than the security level of the user to a server device 3.

FIG. 14 is a view illustrating user level check information being a list of the security levels of the users stored in the HDD 14. The levels of security are level 1, level 2, and level 3 from the highest one in descending order. In a case of the example illustrated in FIG. 14, the security level information of "1" is assigned to the user whose user name is "suzuki". An authenticating unit 45 illustrated in FIG. 5 refers to the user level check information stored in the HDD 14 to detect the security level of the user and notifies a transfer determining unit 48 of the same when performing user authentication described above.

The transfer determining unit 48 determines that the user to which the security level information of "1" is assigned may transfer the request to which the security check information of "1" is assigned described with reference to FIG. 12. The security level information of "2" is assigned to the user whose user name is "katayama". The transfer determining unit 48 determines that the user to which the security level information of "2" is assigned may transfer the request to which the security check information of "2" "or "3" is assigned described with reference to FIG. 12. A communication control unit 42 transfers only the request determined to be transferable by the transfer determining unit 48 to the server device 3 through a communicating unit 15.

Such information processing system of the fourth embodiment may transfer only the request matching an individual security level of the user to the server device 3. According to this, it is possible to improve security of the information processing system and acquire an effect similar to that of the above-described embodiments.

Fifth Embodiment

An information processing system being a fifth embodiment is next described. Although the security level is set for each user in the above-described fourth embodiment, the security level is set for each role of the user (general user, user administrator, or device administrator) in the fifth embodiment.

In a case of the information processing system of the fifth embodiment, security check information described with reference to FIG. 12 is stored in a storage unit such as a HDD 14 of an MFP 1. Role level check information in which the security level for each request is set for each role of the user (general user, user administrator, or device administrator) is stored as illustrated in FIG. 15 in the storage unit such as the HDD 14. The levels of security are level 1, level 2, and level 3 from the highest one in descending order.

In a case of the example illustrated in FIG. 15, a transfer determining unit 48 determines that the request to which the security level of "1" is assigned of the security check information described with reference to FIG. 12 may be transferred for the role of the device administrator to which the security level of "1" is assigned. This determines that the request to which the security level of "2" or "3" is assigned of the security check information described with reference to FIG. 12 may be transferred for the role of the user administrator to which the security level information of "2" is assigned. A communication control unit 42 transfers only the request determined to be transferable by the transfer determining unit 48 to the server device 3 through a communicating unit 15.

Such information processing system of the fifth embodiment may transfer only the request with the security level allowed for each role to the server device 3. According to this, it is possible to improve security of the information processing system and acquire an effect similar to that of the above-described embodiments.

Sixth Embodiment

An information processing system being a sixth embodiment is next described. In a case of the information processing system of the first embodiment described above, the request from the portable terminal device 2 is classified as any one of the request to the MFP 1, the request to the server device 3, and the illegal request as described with reference to FIG. 10. However, when the request from the portable terminal device 2 to the MFP 1 is the request for a function or information which the MFP 1 does not have, the request from the portable terminal device 2 is processed with difficulty. Therefore, the information processing system of the sixth embodiment determines whether the request may be processed by the MFP 1 when there is the request from the portable terminal device 2 to the MFP 1. When the MFP 1 has difficulty in processing the request, the request is processed by an external device such as the server device 3 registered in advance corresponding to the portable terminal device.

Figure 16:
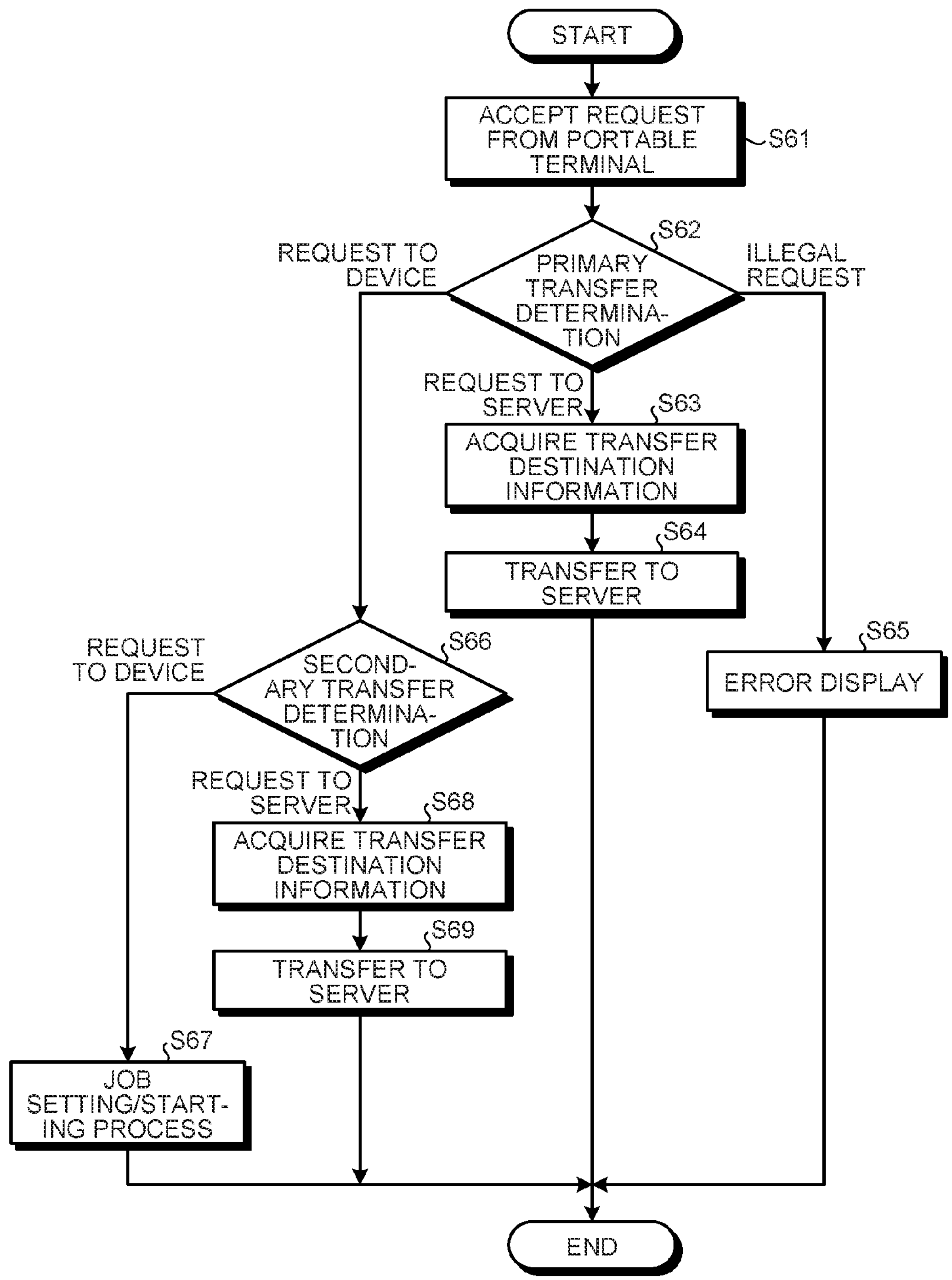
FIG. 16 is a flowchart illustrating a flow of a process of an information processing system of a sixth embodiment.

FIG. 16 is a flowchart illustrating a flow of a process of the information processing system of the sixth embodiment. A CPU 11 of the MFP 1 executes an information processing program for MFP stored in a HDD 14. According to this, each process of the flowchart illustrated in FIG. 16 is executed. In each process of the flowchart in FIG. 16, steps S61 to S65 correspond to steps S51 to S55 of the flowchart in FIG. 10. Please refer to the description of FIG. 10 for more detail.

As illustrated in FIG. 16, in a case of the information processing system of the sixth embodiment, when a transfer determining unit 48 of the MFP 1 determines that the request from the portable terminal device 2 is the request to the MFP 1 (primary determination at step S62), the transfer determining unit 48 performs secondary determination at step S66. In the secondary determination, the transfer determining unit 48 determines whether the request from the portable terminal device 2 may be processed by the MFP 1 or may be processed by another device such as the server device 3.

As an example, also when the portable terminal device 2 requests the MFP 1 which does not have an address book function to acquire a destination in an address book, the request is determined to be the request to the MFP 1 by the transfer determining unit 48 in the primary transfer determination at step S62. In this case, the transfer determining unit 48 of the MFP 1 performs the secondary determination at step S66 to determine whether the request from the portable terminal device 2 may be processed by the MFP 1 or may be processed by another device such as the server device 3.

When the MFP 1 has the address book function, the procedure shifts to step S67. A job accepting unit 46 accepts the request to acquire the destination in the address book from the portable terminal device 2 and a job control unit 47 transfers information of the address book stored in the HDD 14 and the like of the MFP 1 to the portable terminal device 2 at step S67.

On the other hand, when the MFP 1 does not have the address book function, the procedure shifts to step S68. As an example, when the information of the address book is stored in a HDD 36 of the server device 3 registered as a transfer destination of the request of the portable terminal device 2, a communication control unit 42 of the MFP 1 controls a communicating unit 15 to acquire transfer destination information of the server device 3 registered as the transfer destination of the request of the portable terminal device 2 from a transfer destination setting unit 43 at step S68. Then, the communication control unit 42 controls the communicating unit 15 to transfer the request to acquire the destination in the address book from the portable terminal device 2 to the server device 3 indicated by the acquired transfer destination information at step S69. According to this, it is possible to transfer the information of the address book which is provided by the MFP 1 with difficulty from the server device 3 indicated by the transfer destination information to the portable terminal device 2.

Meanwhile, when the request from the portable terminal device 2 is processed with difficulty by the MFP 1 and by the server device 3 registered as the transfer destination of the request of the portable terminal device 2, an error display is displayed on the portable terminal device 2.

It is also possible to acquire information of the function which each server device 3 has from each server device 3 registered as the transfer destination of the request from the portable terminal device 2 to compare and determine the server device 3 to which the request is transferred according to a comparison result as the secondary transfer determination. It is also possible to select the server device 3 which may process the request by a trial-and-error method on each server device to transfer the request from the portable terminal device 2.

Such information processing system of the sixth embodiment may process the request from the portable terminal device 2 by using the external device such as the server device 3 which may process the request when the request is processed by the MFP 1 with difficulty, and acquire the same effect as that of the above-described embodiments.

Seventh Embodiment

An information processing system being a seventh embodiment is next described. In a case of the information processing system of the first embodiment described above, the request from the portable terminal device 2 is classified as any one of the request to the MFP 1, the request to the server device 3, and the illegal request as described with reference to FIG. 10. The information processing system of the seventh embodiment may select an external device which may process the request out of the external devices such as the server device 3 set in advance corresponding to the portable terminal device 2 and process the request by both the MFP 1 and the external device also when the request from the portable terminal device 2 may be processed by the MFP 1.

Figure 17:
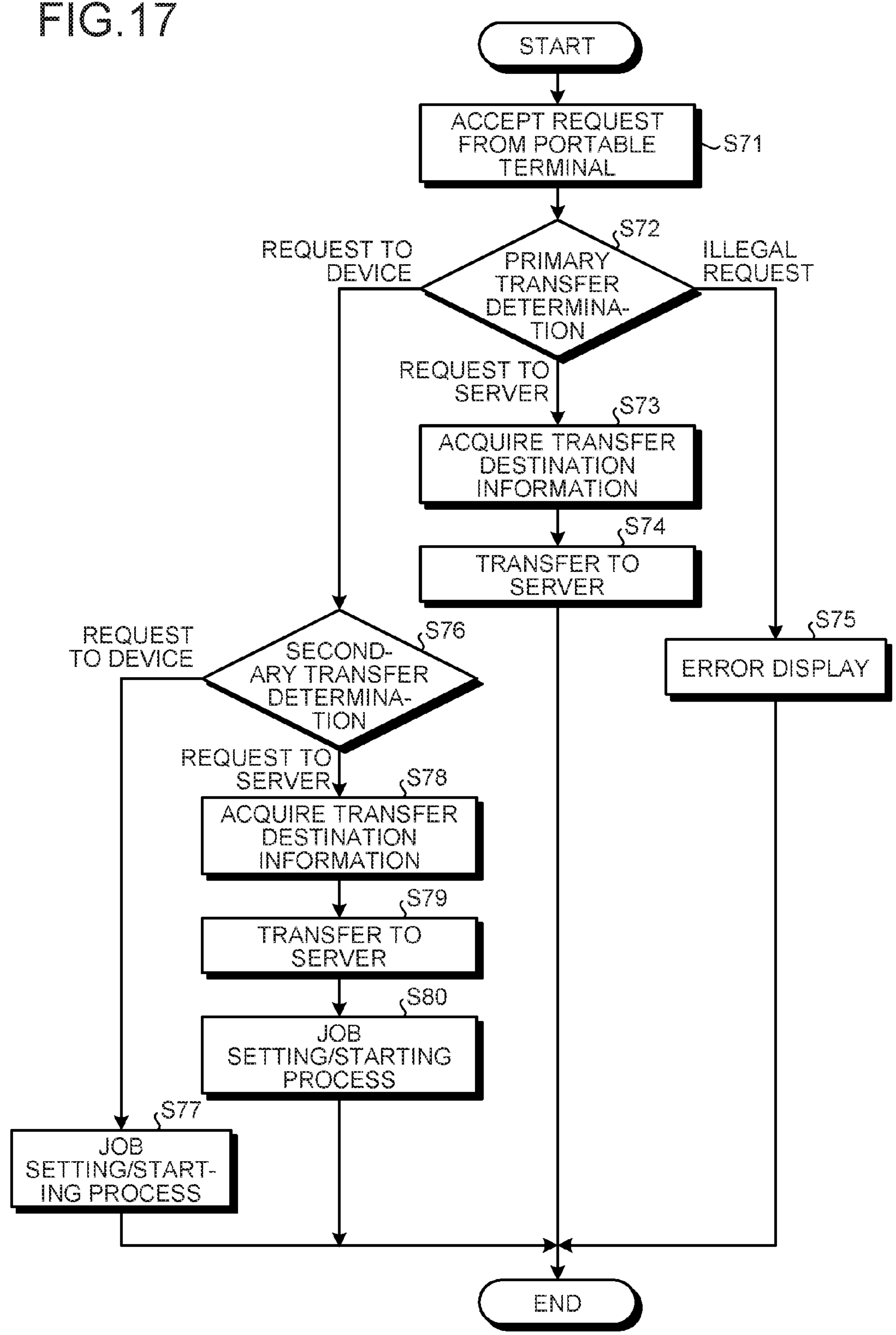
FIG. 17 is a flowchart illustrating a flow of a process of an information processing system of a seventh embodiment.

FIG. 17 is a flowchart illustrating a flow of a process of the information processing system of the seventh embodiment. A CPU 11 of the MFP 1 executes an information processing program for MFP stored in a HDD 14. According to this, each process of the flowchart illustrated in FIG. 17 is executed. In each process of the flowchart in FIG. 17, steps S71 to S75 correspond to steps S51 to S55 of the flowchart in FIG. 10. Please refer to the description of FIG. 10 for more detail.

As illustrated in FIG. 17, in a case of the information processing system of the seventh embodiment, when a transfer determining unit 48 of the MFP 1 determines that the request from the portable terminal device 2 is the request to the MFP 1 (primary determination at step S72), the transfer determining unit 48 performs secondary determination at step S76. In the secondary determination, the transfer determining unit 48 determines whether the request from the portable terminal device 2 may be processed by the MFP 1 or may be processed by another device such as the server device 3.

When the request is determined to be processed by the MFP 1 with difficulty, as in the above-described sixth embodiment, the external device registered in advance such as the server device 3 which may process the request is selected and the request is processed at steps S78 to S80.

On the other hand, when the request is determined to be processable by the MFP 1, a job accepting unit 46 and a job control unit 47 processes a job corresponding to the request at step S77.

The transfer determining unit 48 determines the external device such as the server device 3 which may process the request together with the process of the job. The transfer determining unit 48 selects the external device which may process the request out of the external devices such as the server device 3 registered in advance for the portable terminal device 2 which transfers the request (step S78). The external device which may process the request may also be selected by a trial-and-error selecting method. Alternatively, it is also possible to accumulate a history of request results in the HDD 14 and the like to learn and determine the external device which may process for each request by using a learn result.

At step S79, the request is transferred to the external device selected in this manner. At step S80, the selected external device processes the request of the portable terminal device 2 together with the MFP 1.

Such information processing system of the seventh embodiment may process the request by both the MFP 1 and the external device, so that it is possible to process a complicated request and rapidly process the request and acquire the same effect as that of the above-described embodiments.

Eighth Embodiment

An information processing system being an eighth embodiment is next described. The information processing system of the eighth embodiment classifies a request from a portable terminal device 2 into categories from a viewpoint of presence of a security problem. The request is transferred to a server device 3 registered in advance as a transfer destination of the portable terminal device 2 or the transfer of the request is prohibited according to a classification result.

Figure 18:
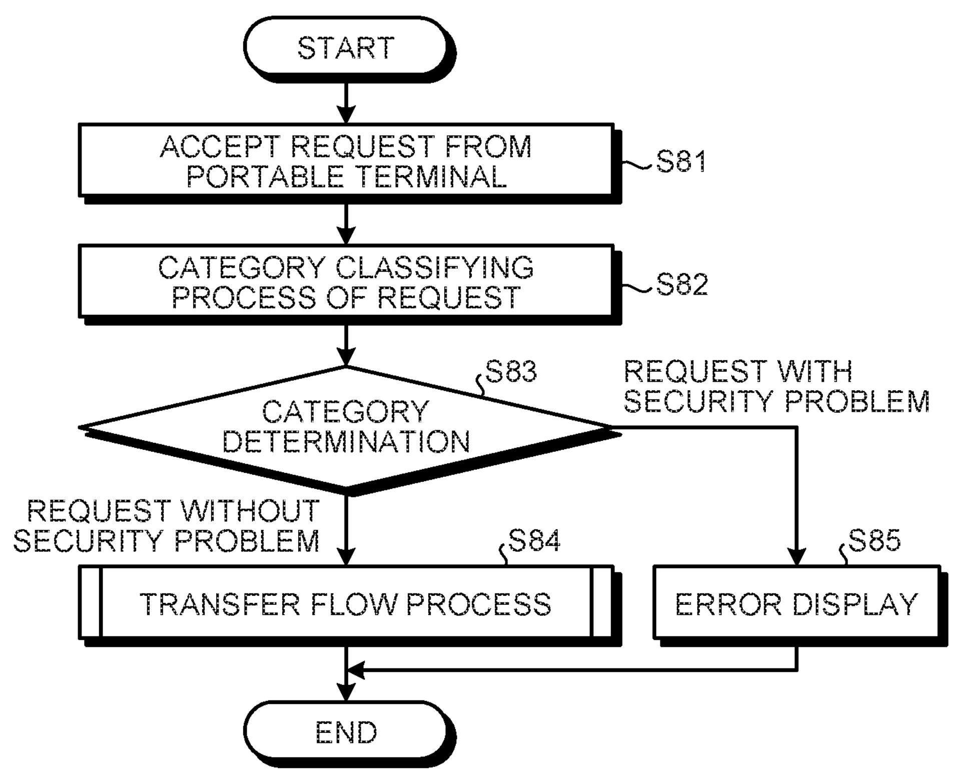
FIG. 18 is a flowchart illustrating a flow of a process of an information processing system of an eighth embodiment.

FIG. 18 is a flowchart illustrating a flow of a process of the information processing system of the eighth embodiment. When the request from the portable terminal device 2 is received by a communicating unit 15 controlled by a communication control unit 42 of an MFP 1 at step S81, a transfer destination setting unit 43 performs a category classifying process of the request at step S82. The transfer destination setting unit 43 is an example of a classifying unit. For example, the transfer destination setting unit 43 classifies the request from the portable terminal device 2 into the categories of an information acquiring type, a read executing type, a transmission executing type, a set value changing type, a deleting type, or a file operating type.

When the request from the portable terminal device 2 falls under a category with a small security problem such as the information acquiring type or the read executing type, for example, by the classifying process, the procedure shifts to step S84. In this case, a transferring process of the request to the server device or an executing process of the request by the MFP 1 described at steps S53 to S56 in FIG. 10 is performed.

On the other hand, when the request from the portable terminal device 2 falls under a category with a large security problem such as the transmission executing type, the set value changing type, the deleting type, or the file operating type, for example, the procedure shifts to step S85. In this case, the transfer of the request is prohibited and an error message and the like is transmitted from the MFP 1 to the portable terminal device 2. Then, the error message is displayed on an operating unit 18 also serving as a display unit by a display control unit 53 of the portable terminal device 2.

In this manner, the information processing system of the eighth embodiment classifies the request from the portable terminal device 2 into the categories and transfers the request which falls under the category with the small security problem to an external device registered in advance such as the server device 3. The transfer of the request which falls under the category with the large security problem is prohibited and the error message is transmitted to the portable terminal device 2 to be displayed. According to this, it is possible to further improve security of the information processing system and acquire an effect similar to that of the above-described embodiments.

Ninth Embodiment

An information processing system being a ninth embodiment is next described. The information processing system of the ninth embodiment registers an API of a request transfer of which is prohibited as a prohibited API and register a user who requests the prohibited API (illegal request) as a prohibited user, thereby limiting usage of the information processing system.

FIG. 19 is a sequence diagram illustrating a flow of operation of prohibiting the API and the user in the information processing system being the ninth embodiment. First, suppose that a file upload request (POST/server/file_upload) being the API to save desired data in a server device 3 is transmitted from a portable terminal device 2 to an MFP 1 at steps S91 and S92 in FIG. 19. The file upload request is transferred to a transfer determining unit 48 at step S93. The transfer determining unit 48 performs a transfer destination determining process described above at step S94 and acquires transfer destination information of the server device 3 registered in advance corresponding to the portable terminal device 2 (steps S95 and S96). The transfer determining unit 48 requests a communication control unit 42 to transfer the file upload request to the server device 3 being a transfer determination result at step S97.

The communication control unit 42 controls a communicating unit 15 to transfer the file upload request to the server device 3 being the transfer determination result at step S98.

At that time, a storage control unit 56 of the server device 3 checks whether an illegal program such as a computer virus is included in a file of the file upload request which is transferred (file to be stored in a HDD 36 and the like). A communication control unit 55 of the server device 3 controls a communicating unit 34 to transmit such a check result to the MFP 1 at step S99.

The MFP 1 receives the check result from the server device 3 by the communicating unit 15 controlled by the communication control unit 42 and transfers the check result to the transfer determining unit 48 at step S100. The transfer determining unit 48 transmits security NG information to the communication control unit 42 at step S101 when the check result from the server device 3 indicates that the illegal program is included in the file of which upload is requested (illegal request information).

When the communication control unit 42 receives the security NG information, this requests a storage control unit 44 to add prohibited data at step S102. The communication control unit 42 controls the communicating unit 15 to transmit the received security NG information to the portable terminal device 2 at step S103.

A communication control unit 52 of the portable terminal device 2 transfers the security NG information to a display control unit 53 at step S104. The display control unit 53 which receives the security NG information displays a warning message on an operating unit 25 which also serves as a display unit at step S105.

In contrast, the storage control unit 44 of the MFP 1 which receives the request to add the prohibited data registers the API of the file upload request in the HDD 14 as the prohibited API (transfer prohibited request). When the storage control unit 44 receives the request to add the prohibited data, this registers the user of the portable terminal device 2 from which the file upload request is transmitted in the HDD 14 as the prohibited user. The communication control unit 42 discards the request registered as the prohibited API from the next time as the prohibited API. The request of the user registered as the prohibited user is also discarded as the prohibited API and the usage of the information processing system is prohibited.

In this manner, when the illegal program is included in the request in the server device 3 to which the request is transferred, the information processing system being the ninth embodiment registers the API of the request as the prohibited API and registers the user who transmits the request as the prohibited user. From the next time, the request registered as the prohibited API is discarded and the usage of the information processing system by the user registered as the prohibited user is prohibited. According to this, it is possible to further enhance security of the information processing system and acquire an effect similar to that of the above-described embodiments.

Tenth Embodiment

An information processing system being a tenth embodiment is next described. The information processing system of the tenth embodiment changes an individual security level of a user of a portable terminal device 2 to a punitive low security level when a request transferred from the portable terminal device 2 to an external device such as a server device is an illegal request including an illegal program or illegal data.

Figure 20:
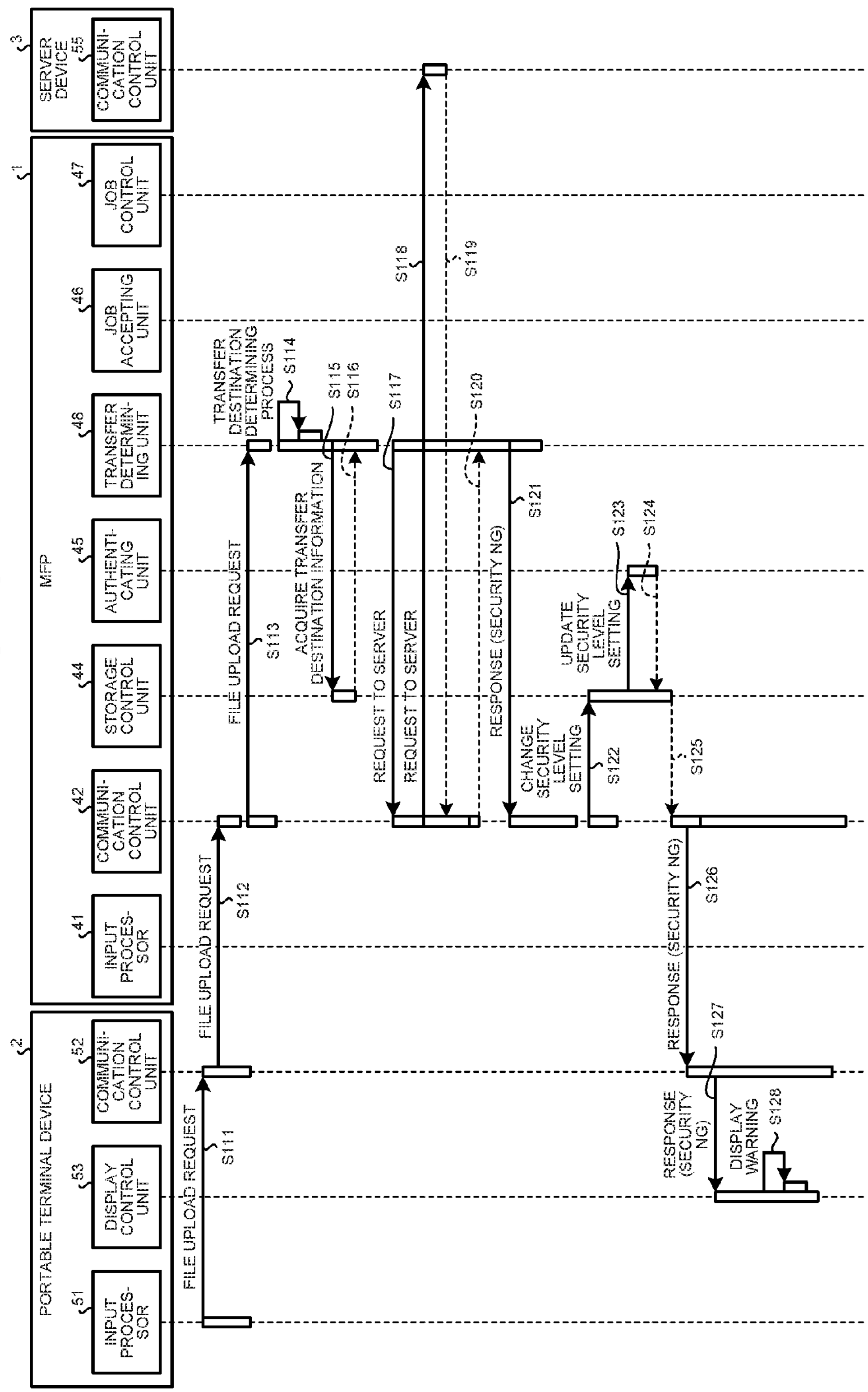
FIG. 20 is a sequence diagram illustrating a flow of changing operation of a security level in an information processing system being a tenth embodiment.

FIG. 20 is a sequence diagram illustrating a flow of operation of changing the security level in the information processing system being the tenth embodiment. First, suppose that a file upload request (POST/server/file_upload) being an API to save desired data in a server device 3 is transmitted from the portable terminal device 2 to an MFP 1 at steps S111 and S112 in FIG. 20. The file upload request is transferred to a transfer determining unit 48 at step S113. The transfer determining unit 48 performs a transfer destination determining process described above at step S114 and acquires transfer destination information of the server device 3 registered in advance corresponding to the portable terminal device 2 (steps S115 and S116). The transfer determining unit 48 requests a communication control unit 42 to transfer the file upload request to the server device 3 being a transfer determination result at step S117.

The communication control unit 42 controls a communicating unit 15 to transfer the file upload request to the server device 3 being the transfer determination result at step S118. At that time, a storage control unit 56 of the server device 3 checks whether an illegal program such as a computer virus is included in a file of the file upload request which is transferred (file to be stored in a HDD 36 and the like). A communication control unit 55 of the server device 3 controls a communicating unit 34 to transmit such a check result to the MFP 1 at step S119.

The MFP 1 receives the check result from the server device 3 by the communicating unit 15 controlled by the communication control unit 42 and transfers the same to the transfer determining unit 48 at step S120. The transfer determining unit 48 transmits security NG information to the communication control unit 42 at step S121 when the check result from the server device 3 indicates that the illegal program is included in the file of which upload is requested (illegal request information).

When the communication control unit 42 receives the security NG information, this requests a transfer destination setting unit 43 to change security level setting at step S122. The request to change the security level setting is transferred from the transfer destination setting unit 43 to a storage control unit 44 at step S123. The storage control unit 44 which receives the request to change the security level setting performs a changing process to downgrade the security level of the user of the portable terminal device 2 who transmits the upload request including the illegal program and the like out of the security levels of the users described with reference to FIG. 14 to the next security level below.

That is to say, the security level of the user whose security level is "2" is downgraded to "3". The security level of the user whose security level is "1" is downgraded to "2". Meanwhile, this is an example in which the security level is downgraded by one level by one transmission of the illegal request. It is also possible to downgrade the security level by two or more levels by one transmission of the illegal request. It is also possible to register the user with the security level changed to the lowest security level who still acts illegal as a prohibited user to prohibit usage of the information processing system as described in the ninth embodiment.

When the changing process of the security level is completed, a completion notification indicating that the changing process of the security level is completed is transmitted from the storage control unit 44 to the communication control unit 42 through the transfer destination setting unit 43 (steps S124 and S125). The communication control unit 42 which receives the completion notification through the communicating unit 15 controls the communicating unit 15 to transmit the security NG information received from the transfer determining unit 48 at step S121 to the portable terminal device 2 (step S126).

A communication control unit 52 of the portable terminal device 2 transfers the security NG information received from the MFP 1 to a display control unit 53 at step S127. The display control unit 53 which receives the security NG information displays a warning message on an operating unit 25 which also serves as a display unit at step S128.

In this manner, when the illegal program and the like is included in the request in the server device 3 to which the request is transferred, the information processing system being the tenth embodiment performs the changing process to downgrade the individual security level of the user. According to this, it is possible to inhibit illegality and acquire an effect similar to that of the above-described embodiments.

Eleventh Embodiment

An information processing system being an eleventh embodiment is next described. The information processing system of the eleventh embodiment collects response information indicating whether a request transferred from a portable terminal device 2 to a server device 3 is processed successfully or not by an MFP 1. Then, this selects the server device 3 which succeeds in processing to transfer the request from the portable terminal device 2 from the next time.

FIG. 21 is flowchart illustrating a flow of collecting the response information from the server device 3 in the information processing system being the eleventh embodiment. Processes at steps S131 to S136 of the flowchart in FIG. 21 correspond to steps S51 to S56 of the flowchart in FIG. 10, respectively. Please refer to the description of the flowchart in FIG. 10 for more detail.

In the flowchart in FIG. 21, steps S137 to S141 are an acquiring routine of the response information from the server device 3. That is to say, when the request from the portable terminal device 2 is determined to be the request to the MFP 1 by primary transfer determination illustrated at step S132, the procedure shifts to step S133. At step S133, a job accepting unit 46 and a job control unit 47 execute the process corresponding to the request.

Next, the procedure shifts to step S137 and a transfer determining unit 48 acquires transfer destination information of an external device such as the server device 3 registered in advance corresponding to the portable terminal device 2. Next, the transfer determining unit 48 determines whether to perform collection of the response information (result determination) for the server device 3 indicated by the transfer destination information at step S139. In a case of combination of the request and the server device 3 the result of which is already determined, the transfer determining unit 48 determines that the result determination is not performed (NG at step S139). In this case, the procedure of the flowchart in FIG. 21 is finished.

On the other hand, when the result determination for the request is not finished yet or the result determination for the server device 3 indicated by the transfer destination information is not finished yet (OK or not yet at step S139), the procedure shifts to step S140. A communication control unit 42 controls a communicating unit 15 to transfer the request from the portable terminal device 2 to the server device 3 indicated by the transfer destination information at step S140. According to this, the response information indicating whether the request is processed successfully or not is transmitted from the server device 3 to the MFP 1.

The communication control unit 42 of the MFP 1 controls the communicating unit 15 to receive the response information from the server device 3. A storage control unit 44 of the MFP 1 associates the response information received from the server device 3 with the transferred request and the server device 3 from which the response information is transmitted and accumulates the same as process check information in a HDD 14 at step S141. According to this, a process result of each server device 3 for each request is accumulated in the HDD 14.

When the communication control unit 42 receives the request from the portable terminal device 2, this refers to the process check information stored in the HDD 14 to determine whether the server device 3 indicated by the above-described transfer destination information processes the request to be transmitted successfully. When the communication control unit 42 determines that the request is processed successfully, this controls the communicating unit 15 to transmit the request from the portable terminal device 2 to the server device 3 indicated by the transfer destination information. On the other hand, when the communication control unit 42 determines that the request is processed unsuccessfully, this controls the communicating unit 15 to prohibit the transfer of the request from the portable terminal device 2.

In this manner, the information processing system of the eleventh embodiment determines in advance whether the request may be processed by the server device to which the request is transferred and transfers the request to the server device 3 when this may be processed. According to this, it is possible to improve transfer efficiency of the request from the portable terminal device 2 and acquire an effect similar to that of the above-described embodiments.

Twelfth Embodiment

An information processing system being a twelfth embodiment is next described. In a case of the information processing system of the eleventh embodiment described above, when the request is processed successfully in the past, this is transmitted to the server device 3, and when the request is processed unsuccessfully in the past, the transmission of the same to the server device 3 is prohibited. On the other hand, in the information processing system of the twelfth embodiment, the request processed successfully in the past and the request similar to the request processed successfully in the past are transmitted to the server device 3, and the transmission of the request which is processed unsuccessfully in the past to the server device 3 is prohibited.

That is to say, as described as the eleventh embodiment with reference to FIG. 21, when the request from the portable terminal device 2 is transferred from an MFP 1 to an external device such as the server device 3, response information indicating whether the request is processed successfully or not is transmitted from the external device such as the server device 3 to the MFP 1. A storage control unit 44 associates the response information, the server device 3, and an API transferred to the server device 3 with one another and stores the same in a HDD 14 as process check information described above.

Figure 22:
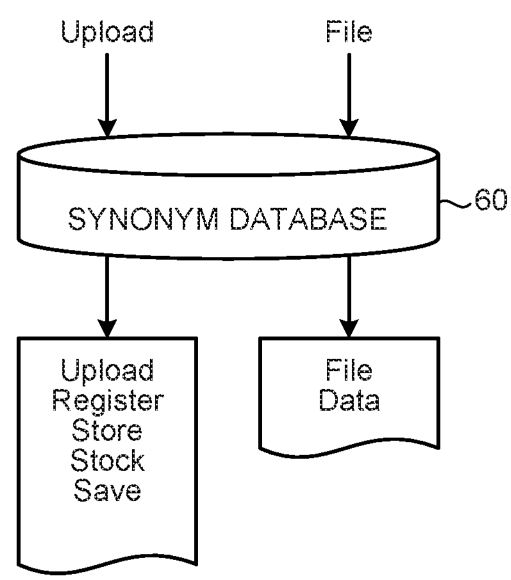
FIG. 22 is a view for illustrating a synonym database stored in an MFP of an information processing system being a twelfth embodiment.

On the other hand, the storage control unit 44 extracts one or a plurality of keywords from the API of the request transferred to the server device 3. A synonym database 60 illustrated in FIG. 22 is stored in the HDD 14. Synonyms such as “upload, register, store, stock, save . . . ”, “file, data” and the like are registered, for example, in the synonym database 60. The storage control unit 44 searches the synonym of the keyword extracted from the request from the portable terminal device 2 from the synonym database 60.

Figure 23:
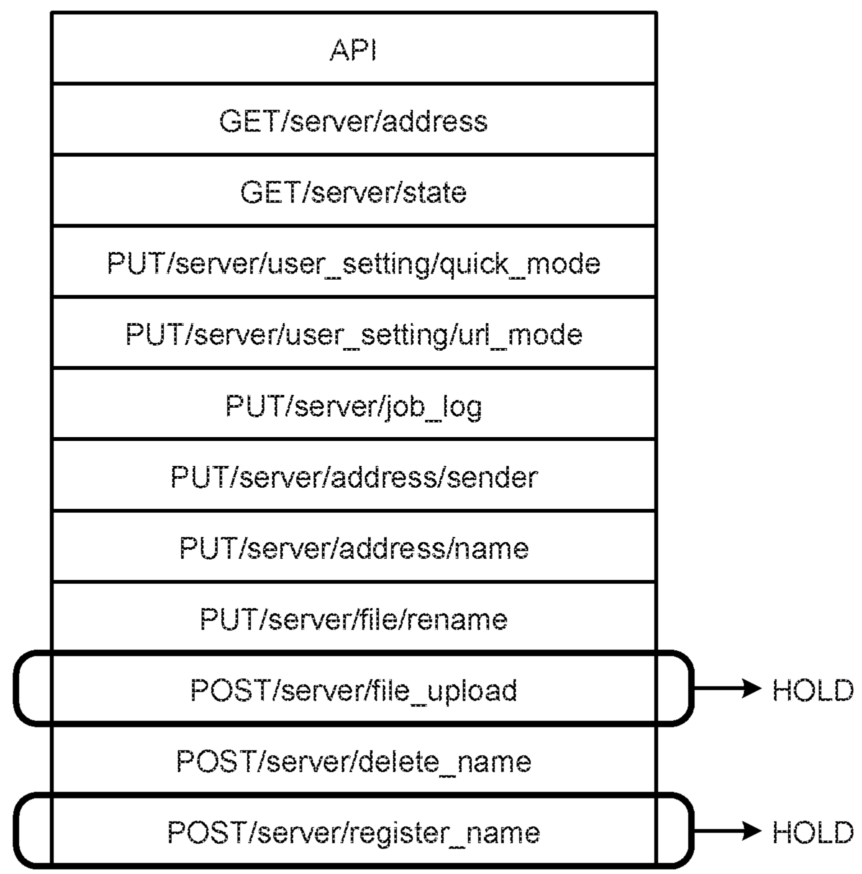
FIG. 23 is a view for illustrating a list of APIs stored in the MFP of the information processing system being the twelfth embodiment.

A list of APIs illustrated in FIG. 23 is stored in the HDD 14. The storage control unit 44 searches the API including the synonym searched from the synonym database 60 (similar API) from the list of the APIs stored in the HDD 14. The storage control unit of the MFP 1 adds the searched similar API to the process check information to store in the HDD 14. According to this, each request (API), the server device 3 which processes the request, a process result (successful or not), and the similar request (similar API) are associated with one another to be stored in the HDD 14 as the process check information.

Next, a communication control unit 42 refers to the process check information of the HDD 14 when transferring the request from the portable terminal device 2. This determines whether the API of the request transferred is the API processed successfully by the server device 3 indicated by transfer destination information described above or the similar API, or whether this is the API processed unsuccessfully by the server device 3 or the similar API.

When the communication control unit 42 determines that the API of the request transferred is the API processed successfully by the server device 3 indicated by the above-described transfer destination information or the similar API, this controls a communicating unit 15 to transfer the request from the portable terminal device 2 to the server device 3 indicated by the above-described transfer destination information. On the other hand, when this determines that the API of the request transferred is the API processed unsuccessfully by the server device 3 indicated by the above-described transfer destination information or the similar API, this controls the communicating unit 15 to prohibit the transfer of the request from the portable terminal device 2.

In this manner, when the request from the portable terminal device 2 is the request (API) processed successfully by the server device 3 in the past or the similar request (similar API), the information processing system of the twelfth embodiment transfers the same to the server device 3. When the request from the portable terminal device 2 is the request (API) processed unsuccessfully by the server device 3 in the past or the similar request (similar API), this prohibits the transfer to the server device 3. According to this, it is possible to improve transfer efficiency of the request from the portable terminal device 2 and acquire an effect similar to that of the above-described embodiments.

Thirteenth Embodiment

An information processing system being a thirteenth embodiment is next described. The information processing system of the thirteenth embodiment shares information indicating a request from a portable terminal device 2 in which a problem in processing occurs among a plurality of MFPs 1.

A sequence diagram in FIG. 24 illustrates a flow of operation to share the information indicating the request from the portable terminal device 2 in which the problem in processing occurs among a plurality of MFPs 1 in the information processing system being the thirteenth embodiment. In an example of the information processing system illustrated in FIG. 24, first and second MFPs 1A and 1B are included as the MFPs. The MFP 1A and the MFP 1B receive response information described above transmitted from a server device 3 when the problem in processing the request of the portable terminal device 2 transferred to the server device 3 occurs.

The response information includes information indicating whether the process is successful or not described above, the request in which the problem occurs, the portable terminal device 2 which transfers the request in which the problem occurs, a user of the portable terminal device 2, a server device which processes the request and the like. A storage control unit 44 of each of the MFP 1A and the MFP 1B stores the response information in a HDD 14 each time this receives the same from the server device 3. According to this, problem occurrence history information which is a history of problem occurrence is formed to be stored in the HDD 14.

In such information processing system, suppose that a transfer destination setting unit 43 of the first MFP 1A requests to acquire the problem occurrence history information at step S151. The request to acquire the problem occurrence history information may be issued at timing specified by an administrator and the like of the MFP 1 or issued by each MFP to another MFP 1 at a predetermined time interval (poling).

A communication control unit 42 of the first MFP 1A controls a communicating unit 15 to transmit the request to acquire the problem occurrence history information to the second MFP 1B (step S152). The second MFP 1B receives the request to acquire the problem occurrence history information by the communicating unit 15 controlled by the communication control unit 42 to transfer to the storage control unit 44 (step S153). The storage control unit 44 reads the problem occurrence history information being the history of the problems occurring in the second MFP 1B from the HDD 14 of the MFP 1B to transfer to the communication control unit 42 (step S154). The communication control unit 42 of the MFP 1B controls the communicating unit 15 to transmit problem occurrence history information read from the HDD 14 to the MFP 1A (step S155).

The first MFP 1A receives the problem occurrence history information transmitted from the second MFP 1B by the communicating unit 15 controlled by the communication control unit 42 to transfer to the transfer destination setting unit 43 (step S156). The transfer destination setting unit 43 transfers the problem occurrence history information to the storage control unit 44 (step S157). The storage control unit 44 stores the problem occurrence history information in the HDD 14 and notifies the transfer destination setting unit 43 that storage is completed when the storage is completed (step S158). According to this, the problem occurrence history information stored in the second MFP 1B may be used (shared) by the first MFP 1A.

That is to say, suppose that a file upload request from the portable terminal device 2 is transmitted to the first MFP 1A at steps S159 and S160. The first MFP 1A receives the file upload request by the communicating unit 15 controlled by the communication control unit 42 to transfer to a transfer determining unit 48 (step S161). The transfer determining unit 48 refers to the problem occurrence history information of the MFP 1A and the MFP 1B stored in the HDD 14 at step S162. The transfer determining unit 48 determines whether an API of the file upload request from the portable terminal device 2 is the API in which the problem in processing occurs in the MFP 1A or the MFP 1B. When the problem occurrence history information corresponding to the file upload request from the portable terminal device 2 is stored in the HDD 14, the transfer determining unit 48 prohibits the transfer of the file upload request and discards the file upload request.

On the other hand, when the problem occurrence history information corresponding to the file upload request from the portable terminal device 2 is not stored in the HDD 14, the transfer determining unit 48 acquires transfer destination information indicating the server device 3 serving as a transfer destination from the storage control unit 44 (steps S163 and S164). The transfer determining unit 48 requests the communication control unit 42 to transfer the file upload request (step S165). According to this, the communication control unit 42 controls the communicating unit 15 to transfer the file upload request from the portable terminal device 2 to the server device 3 indicated by the transfer destination information (step S166).

Next, the server device 3 transmits a response to the file upload request from the portable terminal device 2 to the first MFP 1A through a communicating unit 34 controlled by a communication control unit 55 at step S167. The first MFP 1A receives the response from the server device 3 by the communicating unit 15 controlled by the communication control unit 42 (step S167) and transfers the same to the transfer determining unit 48 (step S168). The transfer determining unit 48 transmits the response from the server device 3 to the portable terminal device 2 through the communicating unit 15 controlled by the communication control unit 42 (steps S169 and S170). A communication control unit 52 of the portable terminal device 2 controls a communicating unit 24 to receive the response from the server device 3 and transfers the received response to a display control unit 53. The display control unit 53 displays the response from the server device 3 on an operating unit 25 also serving as the display unit (step S171).

Such information processing system of the thirteenth embodiment may share the problem occurrence history information indicating the API in which the problem occurs by the MFPs. This may prohibit the transfer of the API in which the problem occurs. Therefore, it is possible to improve transfer efficiency of the request from the portable terminal device 2 and acquire an effect similar to that of the above-described embodiments.

Fourteenth Embodiment

An information processing system being a fourteenth embodiment is next described. The information processing system of the fourteenth embodiment shares problem occurrence history information described above by a plurality of MFPs 1. This also downgrades an individual security level of a user of a portable terminal device 2 who transmits a request in which a problem in processing occurs and shares the same by a plurality of MFPs 1.

Figure 25:
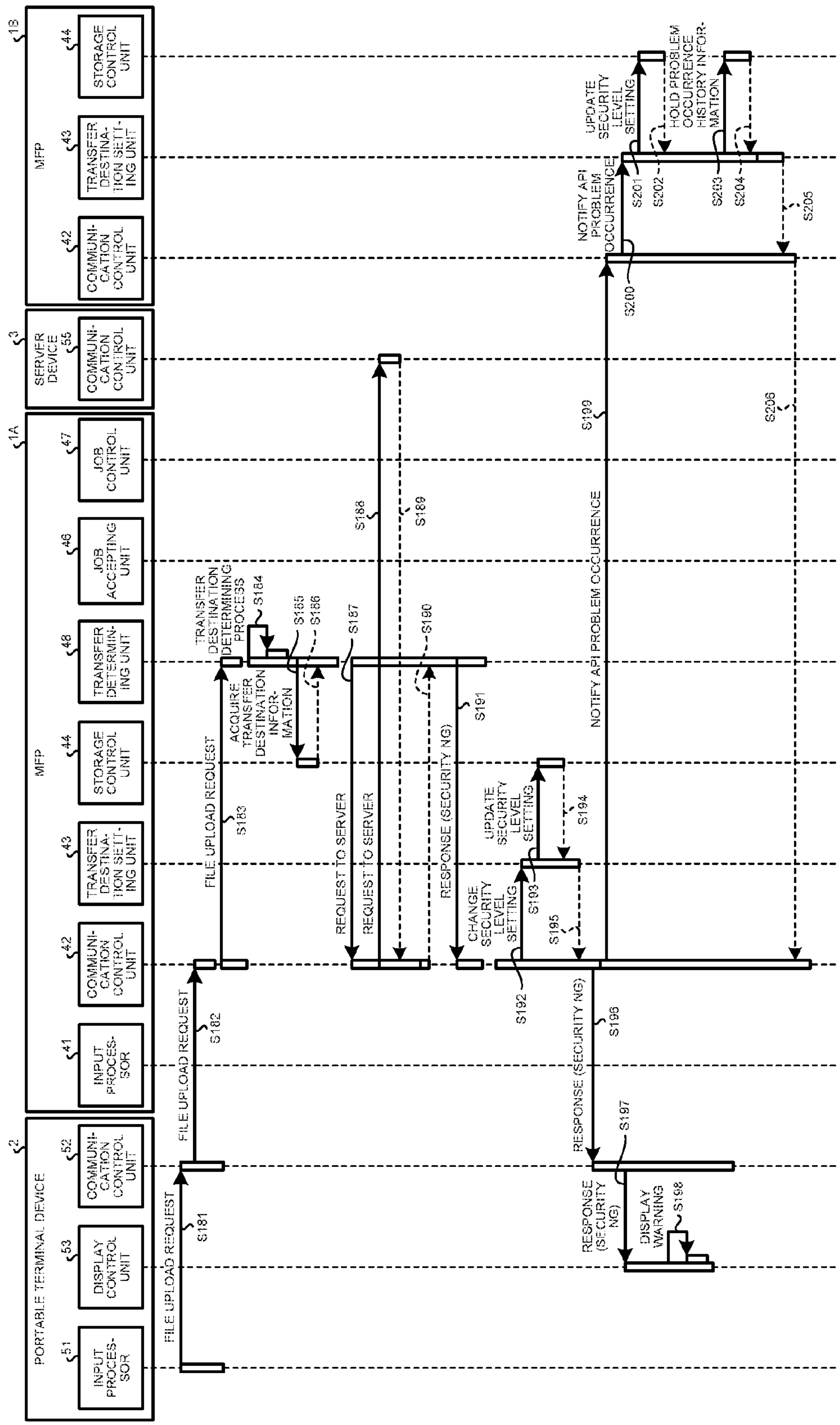
FIG. 25 is a sequence diagram illustrating a flow of operation to share problem occurrence history information and a security level of each user among MFPs in an information processing system being a fourteenth embodiment.

A sequence diagram in FIG. 25 illustrates a flow of operation to share the problem occurrence history information and the security level of each user among the MFPs 1 in the information processing system being the fourteenth embodiment. In an example of the information processing system illustrated in FIG. 25, first and second MFPs 1A and 1B are included as the MFPs. When the problem in processing the request of the portable terminal device 2 transferred to the server device 3 occurs, the MFP 1A and the MFP 1B record a problem occurrence history in a HDD 14 to hold. The MFP 1A and the MFP 1B downgrade the security level of the user of the portable terminal device 2 who transmits the request in which the problem in processing occurs and share the same.

In such information processing system, suppose that an instruction to transfer a file upload request is issued from the user of the portable terminal device 2. The file upload request is transferred to a communication control unit 52 through an input processor 51 of the portable terminal device 2 (step S181). The communication control unit 52 controls a communicating unit 24 to transmit the file upload request to the first MFP 1A (step S182).

A communication control unit 42 of the first MFP 1A transfers the file upload request received from the portable terminal device 2 through a communicating unit 15 to a transfer determining unit 48 (step S183). The transfer determining unit 48 performs a transfer destination determining process described above at step S184. The file upload request is the request to the server device 3. Therefore, the transfer determining unit 48 requests a storage control unit 44 to acquire transfer destination information of the server device 3 registered in advance as a connecting destination corresponding to the portable terminal device 2 (step S185). The storage control unit 44 reads the transfer destination information of the server device 3 registered in advance as the connecting destination corresponding to the portable terminal device 2 from the HDD 14 to transfer to the transfer determining unit 48 (step S186).

The transfer determining unit 48 next notifies the communication control unit 42 of the transfer destination information of the server device 3 which becomes a transfer destination and requests the same to transfer the file upload request (step S187). The communication control unit 42 controls the communicating unit 15 to transfer the file upload request to the server device 3 indicated by the transfer destination information notified by the transfer determining unit 48 (step S188). The server device 3 which stores a file the upload of which is requested in a HDD 36 prohibits the file upload when an illegal program such as a computer virus or illegal data is included in the file. Then, the server device 3 transmits response information indicating that the file upload request from the portable terminal device 2 is an illegal request (security NG) to the first MFP 1A through the communicating unit 34 controlled by a communication control unit 55 (step S189).

The first MFP 1A receives the response information by the communicating unit 15 controlled by the communication control unit 42 and transfers the received response information to the transfer determining unit 48 (step S190). The transfer determining unit 48 transfers the response information indicating that the request is illegal to the communication control unit 42 (step S191). When the communication control unit 42 receives the response information indicating that the request is illegal, this requests the storage control unit 44 to change the security level and the problem occurrence history information (steps S192 and S193).

The storage control unit 44 changes to downgrade the security level of the user who issues the file upload request out of the security levels of the users stored in the HDD 14 (refer to FIG. 14). The storage control unit 44 adds an API of the file upload request to the problem occurrence history information stored in the HDD 14. The storage control unit 44 transmits completion notification to the communication control unit 42 when updating of the security level and the problem occurrence history information is completed (steps S194 and S195).

When the communication control unit 42 receives the completion notification, this transmits the response information indicating that the file upload request is the illegal request received from the server device 3 to the portable terminal device 2 (step S196). The communication control unit 52 of the portable terminal device 2 receives the response information through the communicating unit 24 and transfers the same to the display control unit 53 (step S197). The display control unit 53 displays the response information from the server device 3 on an operating unit 25 serving also as a display unit (step S198).

On the other hand, when the communication control unit 42 of the first MFP 1A receives the completion notification of an updating process of the security level and the problem occurrence history information, this controls the communicating unit 15 to transmit a problem occurrence notification indicating that the problem occurs in the API of the file upload request to the second MFP 1B (step S199).

The communication control unit 42 of the second MFP 1B receives the problem occurrence notification from the first MFP 1A through the communicating unit 15 of the second MFP 1B and transfers the same to a transfer destination setting unit 43 (step S200). When the transfer destination setting unit 43 of the second MFP 1B receives the problem occurrence notification, this requests the storage control unit 44 to change the security level of the user who issues the illegal file upload request indicated by the problem occurrence notification (step S201). The storage control unit 44 changes to downgrade the security level of the user who issues the illegal file upload request out of the security levels of the users stored in the HDD 14 of the second MFP 1B (refer to FIG. 14). When the storage control unit 44 changes the security level, this transmits the completion notification indicating that the change is completed to the transfer destination setting unit 43 (step S202).

When receiving the completion notification indicating that the change in the security level is completed, the transfer destination setting unit 43 requests the storage control unit 44 to add the problem occurrence history information (step S203). When the storage control unit 44 receives the request to add the problem occurrence history information, this adds the API of the illegal file upload request to the problem occurrence history information stored in the HDD 14. The storage control unit 44 transmits completion notification indicating that the addition is completed to the communication control unit 42 through the transfer destination setting unit 43 when the addition of the problem occurrence history information is completed (steps S204 and S205). The completion notification indicating that the addition is completed is transmitted from the second MFP 1B to the first MFP 1A (step S206).

In such information processing system of the fourteenth embodiment, the MFP 1 may automatically update and share the problem occurrence history information and the security levels of the users. Therefore, it is possible to treat the user who issues the illegal request as a prohibited user in each MFP 1. It is possible to automatically enhance the security of the information processing system and acquire an effect similar to that of the above-described embodiments.

The present invention has an effect of enabling communication between a portable terminal device and another device connected to a network through an intermediating device connected to a predetermined network while securing security of the network.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:

at least one memory having computer readable instructions stored thereon; and at least one processor, wherein the computer readable instructions when executed by the at least one processor configure the at least one processor to, communicate with a portable terminal device and an external device;

receive a designation of an external device;

determine whether to associate a permission with the external device indicating that data received from the portable terminal device is allowed to be transferred to the external device;

store transfer destination information of the external device in a storage unit in response to associating the permission with the external device, the transfer destination information being used for transferring the received data to the external device to which the received data is allowed to be transferred based on the permission;

receive response information from the external device each time a request received from the portable terminal device is transferred to the external device;

form problem occurrence history information by storing the response information received from the external device in the storage unit each time the response information indicates that a problem in processing a transferred request by the external device occurred;

store user level check information indicating a security level for each user of the portable terminal device together with the problem occurrence history information in the storage unit;

perform a changing process to downgrade the security level of the user of the portable terminal device who transmitted the transferred request in which the problem in processing by the external device occurred in response to receiving the response information from the external device indicating that the problem in processing the transferred request by the external device occurred;

receive, from the portable terminal device, a request to process the received data;

determine whether the request received from the portable terminal device is a request to the external device indicated by the transfer destination information;

transfer the received data to the external device using the transfer destination information in response to the at least one processor determining that the request received from the portable terminal device is the request to the external device indicated by the transfer destination information and is transmitted by a user not having the downgraded security level; and prohibit transfer of the received data to the external device in response to the at least one processor determining that the request received from the portable terminal device is transmitted by the user having the downgraded security level.

2. The image forming apparatus according to claim 1, wherein the computer readable instructions when executed by the at least one processor further configure the at least one processor to, determine whether the request received from the portable terminal device is a request to the image forming apparatus or the request to the external device indicated by the transfer destination information, and perform a process corresponding to the request received from the portable terminal device in response to the at least one processor determining that the request received from the portable terminal device is the request to the image forming apparatus.

3. The image forming apparatus according to claim 1, wherein the computer readable instructions when executed by the at least one processor further configure the at least one processor to, determine whether the request received from the portable terminal device is an illegal request to an unregistered external device which does not have corresponding transfer destination information stored in the storage unit, and prohibit transfer of the received data to the unregistered external device in response to the at least one processor determining that the request received from the portable terminal device is the illegal request.

4. The image forming apparatus according to claim 1, wherein the computer readable instructions when executed by the at least one processor further configure the at least one processor to, store security check information indicating a security level of each request received from the portable terminal device and specified level information indicating a security level of the request allowed to be transferred to the external device, refer to the security check information to determine the security level of the request received from the portable terminal device and refer to the specified level information to determine the security level of the request allowed to be transferred to the external device, and transfer the received data to the external device in response to the at least one processor determining that the security level of the request received from the portable terminal device is not lower than the security level of the request allowed to be transferred to the external device.

5. The image forming apparatus according to claim 1, wherein the computer readable instructions when executed by the at least one processor further configure the at least one processor to, store authority check information indicating whether each request received from the portable terminal device may be transferred for each authority of a user of the portable terminal device, refer to the authority check information to determine whether the request received from the portable terminal device is the request allowed to be transferred for the authority of the user of the portable terminal device, and transfer the received data to the external device in response to the at least one processor determining that the request received from the portable terminal device is the request allowed to be transferred for the authority of the user of the portable terminal device.

6. The image forming apparatus according to claim 1, wherein the computer readable instructions when executed by the at least one processor further configure the at least one processor to, store security check information indicating a security level of each request received from the portable terminal device together with the user level check information indicating the security level for each user of the portable terminal device, determine whether the security level of the request received from the portable terminal device indicated by the security check information is not higher than the security level of the user of the portable terminal device who transmitted the request indicated by the user level check information, and transfer the received data to the external device in response to the at least one processor determining that the security level of the request received from the portable terminal device indicated by the security check information is not higher than the security level of the user of the portable terminal device who transmitted the request indicated by the user level check information.

7. The image forming apparatus according to claim 1, wherein the computer readable instructions when executed by the at least one processor further configure the at least one processor to, store security check information indicating a security level of each request received from the portable terminal device and authority level check information indicating a security level of each request for each authority of a user of the portable terminal device, determine whether the security level of the request received from the portable terminal device indicated by the security check information is not higher than the security level of the authority of the user of the portable terminal device who transmitted the request indicated by the authority level check information, and transfer the received data to the external device in response to the at least one processor determining that the security level of the request received from the portable terminal device indicated by the security check information is not higher than the security level of the authority of the user of the portable terminal device who transmitted the request indicated by the authority level check information.

8. The image forming apparatus according to claim 2, wherein the computer readable instructions when executed by the at least one processor further configure the at least one processor to, determine whether the request received from the portable terminal device may be processed by the image forming apparatus in response to the at least one processor determining that the request received from the portable terminal device is the request to the image forming apparatus and determine whether the request received from the portable terminal device may be processed by the external device indicated by the transfer destination information of the request received from the portable terminal device in response to the at least one processor determining that the request would be processed by the image forming apparatus with difficulty, and transfer the received data to the external device in response to the at least one processor determining that the external device would be able to process the request and determining that the request would be processed by the image forming apparatus with difficulty.

9. The image forming apparatus according to claim 2, wherein the computer readable instructions when executed by the at least one processor further configure the at least one processor to, determine whether the request received from the portable terminal device may be processed by the external device indicated by the transfer destination information of the request received from the portable terminal device in response to the at least one processor determining that the request received from the portable terminal device is the request to the image forming apparatus, perform a process corresponding to the request received from the portable terminal device in response to the at least one processor determining that the request received from the portable terminal device is the request to the image forming apparatus, and transfer the received data to the external device in response to the at least one processor determining that the external device would be able to process the request.

10. The image forming apparatus according to claim 1, wherein the computer readable instructions when executed by the at least one processor further configure the at least one processor to, classify the request received from the portable terminal device into a plurality of categories, and prohibit transfer of the received data to the external device in response to the at least one processor classifying the request received from the portable terminal device under a category with a large security problem, and transfer the received data to the external device in response to the at least one processor classifying the request received from the portable terminal device under a category with a small security problem.

11. The image forming apparatus according to claim 1, wherein the computer readable instructions when executed by the at least one processor further configure the at least one processor to, receive, from the external device to which the request received from the portable terminal device is transferred, response information including illegal request information indicating that the transferred request terminal device is an illegal request, store the transferred request which is determined by the external device to be the illegal request in the storage unit as a transfer prohibited request, and discard the request received from the portable terminal device in response to the request being stored as the transfer prohibited request.

12. The image forming apparatus according to claim 11, wherein the computer readable instructions when executed by the at least one processor further configure the at least one processor to, store the user of the portable terminal device who transmitted the transfer prohibited request in the storage unit as a prohibited user, and discard the request received from the portable terminal device in response to the request being received from the user stored as the prohibited user who transmitted the transfer prohibited request.

13. The image forming apparatus according to claim 6, wherein the computer readable instructions when executed by the at least one processor further configure the at least one processor to, receive, from the external device to which the request received from the portable terminal device is transferred, response information including illegal request information indicating that the transferred request is an illegal request, perform the changing process to downgrade the security level of the user of the portable terminal device who transmitted the illegal request out of security levels of users of the portable terminal device stored in the storage unit as the user level check information.

14. The image forming apparatus according to claim 1, wherein the computer readable instructions when executed by the at least one processor further configure the at least one processor to, store response information received from the external device indicating whether a transferred request is processed successfully or unsuccessfully by the external device in the storage unit as process check information in association with the transferred request and the external device from which the response information is received, refer to the process check information when transferring the request received from the portable terminal device to the external device indicated by the transfer destination information to determine whether the external device would process the request successfully or unsuccessfully, and transfer the received data to the external device in response to the at least one processor determining that the request received from the portable terminal device would be processed successfully by the external device, and prohibit transfer of the received data to the external device in response to the at least one processor determining that the request received from the portable terminal device would be processed unsuccessfully by the external device.

15. The image forming apparatus according to claim 14, wherein the computer readable instructions when executed by the at least one processor further configure the at least one processor to, detect a similar request that is similar to the transferred request to store in the storage unit in association with the transferred request of the process check information, refer to the process check information when the request to process the received data is received from the portable terminal device to determine whether the request would be processed successfully or unsuccessfully by the external device, and transfer the received data to the external device in response to the at least one processor determining that the request received from the portable terminal device is the same as the transferred request processed successfully by the external device or the similar request, and prohibit transfer of the received data to the external device in response to the at least one processor determining that the request received from the portable terminal device is the same as the transferred request processed unsuccessfully by the external device or the similar request.

16. An information processing system comprising:

a portable terminal device configured to transmit a request through a communicating unit;

an external device configured to process the request transmitted from the portable terminal device; and an image forming apparatus configured to intermediate communication between the portable terminal device and the external device, wherein the image forming apparatus includes, at least one memory having computer readable instructions stored thereon; and at least one processor, wherein the computer readable instructions when executed by the at least one processor configure the at least one processor to, communicate with the portable terminal device and the external device;

receive a designation of an external device;

determine whether to associate a permission with the external device indicating that data received from the portable terminal device is allowed to be transferred to the external device;

store transfer destination information of the external device in a storage unit in response to associating the permission with the external device, the transfer destination information being used for transferring the received data to the external device to which the received data is allowed to be transferred based on the permission;

receive response information from the external device each time a request received from the portable terminal device is transferred to the external device;

form problem occurrence history information by storing the response information received from the external device in the storage unit each time the response information indicates that a problem in processing a transferred request by the external device occurred;

store user level check information indicating a security level for each user of the portable terminal device together with the problem occurrence history information in the storage unit;

perform a changing process to downgrade the security level of the user of the portable terminal device who transmitted the transferred request in which the problem in processing by the external device occurred in response to receiving the response information from the external device indicating that the problem in processing the transferred request by the external device occurred;

receive, from the portable terminal device, a request to process the received data;

determine whether the request received from the portable terminal device is a request to the external device indicated by the transfer destination information;

transfer the received data to the external device using the transfer destination information in response to the at least one processor determining that the request received from the portable terminal device is the request to the external device indicated by the transfer destination information and is transmitted by a user not having the downgraded security level; and prohibit transfer of the received data to the external device in response to the at least one processor determining that the request received from the portable terminal device is transmitted by the user having the downgraded security level.

17. A non-transitory computer-readable medium comprising computer readable program codes, the computer readable program codes when executed by a computer causing the computer to:

communicate with a portable terminal device and an external device;

receive a designation of an external device;

determine whether to associate a permission with the external device indicating that data received from the portable terminal device is allowed to be transferred to the external device;

store transfer destination information of the external device in a storage unit in response to associating the permission with the external device, the transfer destination information being used for transferring the received data to the external device to which the received data is allowed to be transferred based on the permission;

receive response information from the external device each time a request received from the portable terminal device is transferred to the external device;

form problem occurrence history information by storing the response information received from the external device in the storage unit each time the response information indicates that a problem in processing a transferred request by the external device occurred;

store user level check information indicating a security level for each user of the portable terminal device together with the problem occurrence history information in the storage unit;

perform a changing process to downgrade the security level of the user of the portable terminal device who transmitted the transferred request in which the problem in processing by the external device occurred in response to receiving the response information from the external device indicating that the problem in processing the transferred request by the external device occurred;

receive, from the portable terminal device, a request to process the received data;

determine whether the request received from the portable terminal device is a request to the external device indicated by the transfer destination information;

transfer the received data to the external device using the transfer destination information in response to the computer determining that the request received from the portable terminal device is the request to the external device indicated by the transfer destination information and is transmitted by a user not having the downgraded security level; and prohibit transfer of the received data to the external device in response to the computer determining that the request received from the portable terminal device is transmitted by the user having the downgraded security level.

18. The image forming apparatus according to claim 1, wherein the computer readable instructions when executed by the at least one processor further configure the at least one processor to, update the problem occurrence history information stored in the storage unit based on problem occurrence history information acquired from another image forming apparatus;

refer to the problem occurrence history information to determine whether a problem in processing the request received from the portable terminal device by the external device would occur based on whether the transferred request was processed successfully or unsuccessfully by the external device indicated by the transfer destination information;

transfer the received data to the external device using the transfer destination information in response to the at least one processor determining that the transferred request was processed successfully by the external device indicated by the transfer destination information; and prohibit transfer of the received data to the external device in response to the at least one Processor determining that the transferred request was processed unsuccessfully by the external device indicated by the transfer destination information.

* * * * *